(12) United States Patent
Lin

(10) Patent No.: US 7,515,446 B2
(45) Date of Patent: *Apr. 7, 2009

(54) HIGH-EFFICIENCY ADAPTIVE DC/AC CONVERTER

(75) Inventor: Yung-Lin Lin, Palo Alto, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/282,873

(22) Filed: Nov. 17, 2005

(65) Prior Publication Data
US 2006/0077700 A1 Apr. 13, 2006

Related U.S. Application Data

(63) Continuation of application No. 10/132,016, filed on Apr. 24, 2002.

(51) Int. Cl.
*H02M 3/24* (2006.01)
(52) U.S. Cl. .............................. 363/98; 363/17; 315/307
(58) Field of Classification Search ............. 363/96–98, 363/31, 40–41, 95, 25, 89, 17, 132, 34, 37; 323/282–285, 224; 315/160, 127, 128, 117, 315/225, 307, 244, 291
See application file for complete search history.

(56) References Cited

U.S. PATENT DOCUMENTS

| | | | |
|---|---|---|---|
| 4,277,728 A | 7/1981 | Stevens | 315/307 |
| 4,461,980 A | 7/1984 | Nilssen | 315/225 |
| 4,461,990 A | 7/1984 | Bloomer | 323/235 |
| 4,466,041 A | 8/1984 | Witulski et al. | |
| 4,504,895 A | 3/1985 | Steigerwald | 363/17 |
| 4,535,399 A | 8/1985 | Szepesi | 363/41 |
| 4,541,041 A | 9/1985 | Park et al. | 363/41 |
| 4,592,087 A | 5/1986 | Killion | 381/68 |
| 4,626,979 A | 12/1986 | JaQuay | 363/41 |
| 4,672,258 A | 6/1987 | Konishi | 313/15 |
| 4,672,528 A | 6/1987 | Park et al. | 363/98 |
| 4,682,084 A | 7/1987 | Kuhnel et al. | |
| 4,689,819 A | 8/1987 | Killion | 381/68 |

(Continued)

FOREIGN PATENT DOCUMENTS

CN 1444332 9/2003

(Continued)

OTHER PUBLICATIONS

English Translation Japanese Notification & Observation document 2001-008143: 29 Pages + previously submitted Japanese Notification & Observation Documents 18 pages.

(Continued)

*Primary Examiner*—Rajnikant B Patel

(57) ABSTRACT

A CCFL power converter circuit is provided using a high-efficiency zero-voltage-switching technique that eliminates switching losses associated with the power MOSFETs. An optimal sweeping-frequency technique is used in the CCFL ignition by accounting for the parasitic capacitance in the resonant tank circuit. Additionally, the circuit is self-learning and is adapted to determine the optimum operating frequency for the circuit with a given load. An over-voltage protection circuit can also be provided to ensure that the circuit components are protected in the case of open-lamp condition.

20 Claims, 11 Drawing Sheets

U.S. PATENT DOCUMENTS

| | | | |
|---|---|---|---|
| 4,727,469 A | 2/1988 | Kammiller | 363/56 |
| 4,794,506 A | 12/1988 | Hino et al. | 363/25 |
| 4,814,692 A | 3/1989 | Baumann | 324/62 |
| 4,814,962 A | 3/1989 | Magalhaes et al. | 363/16 |
| 4,833,584 A | 5/1989 | Divan | 363/37 |
| 4,855,888 A | 8/1989 | Henze et al. | 363/17 |
| 4,859,912 A | 8/1989 | Lippmann et al. | 315/169.3 |
| 4,860,189 A | 8/1989 | Hitchcock | 363/132 |
| 4,864,483 A | 9/1989 | Divan | 363/37 |
| 4,870,327 A | 9/1989 | Jorgensen | 315/307 |
| 4,904,906 A | 2/1990 | Atherton et al. | 315/291 |
| 4,912,622 A | 3/1990 | Steigerwald et al. | 363/98 |
| 4,935,857 A | 6/1990 | Nguyen et al. | 363/17 |
| 4,939,429 A | 7/1990 | Cavazos et al. | 315/411 |
| 4,952,849 A * | 8/1990 | Fellows et al. | 315/307 |
| 4,953,068 A | 8/1990 | Henze | 363/17 |
| 4,958,108 A | 9/1990 | Jorgensen | 315/307 |
| 4,967,332 A | 10/1990 | Claydon et al. | 363/17 |
| 4,983,887 A | 1/1991 | Nilssen | 315/224 |
| 4,988,920 A | 1/1991 | Hoeksma | 315/101 |
| 4,992,919 A | 2/1991 | Lee et al. | 363/17 |
| 5,012,058 A | 4/1991 | Smith | 219/10.55 B |
| 5,017,800 A | 5/1991 | Divan | 307/66 |
| 5,027,263 A | 6/1991 | Harada et al. | 363/16 |
| 5,027,264 A | 6/1991 | DeDoncker et al. | 363/16 |
| 5,030,887 A | 7/1991 | Guisinger | |
| 5,051,661 A | 9/1991 | Lee | 315/225 |
| 5,077,652 A * | 12/1991 | Faley | 363/97 |
| 5,105,127 A | 4/1992 | Lavaud et al. | 315/291 |
| 5,113,334 A | 5/1992 | Tuson et al. | 363/25 |
| 5,132,888 A | 7/1992 | Lo et al. | 363/17 |
| 5,132,889 A | 7/1992 | Hitchcock et al. | 363/17 |
| 5,157,592 A | 10/1992 | Walters | 363/17 |
| 5,166,579 A | 11/1992 | Kawabata et al. | 315/209 |
| 5,198,969 A | 3/1993 | Redl et al. | 363/17 |
| 5,208,740 A | 5/1993 | Ehsani | 363/124 |
| 5,231,563 A | 7/1993 | Jitaru | 363/98 |
| 5,235,501 A | 8/1993 | Stuart et al. | 363/17 |
| 5,239,293 A | 8/1993 | Barbier | |
| 5,268,830 A | 12/1993 | Loftus, Jr. | 363/17 |
| 5,270,620 A | 12/1993 | Basch et al. | 315/291 |
| 5,285,372 A | 2/1994 | Huynh et al. | 363/132 |
| 5,287,040 A | 2/1994 | Lestician | 315/291 |
| 5,291,382 A | 3/1994 | Cohen | 363/16 |
| 5,305,191 A | 4/1994 | Loftus, Jr. | 363/17 |
| 5,311,104 A | 5/1994 | Antle | 315/307 |
| 5,315,498 A | 5/1994 | Berrios et al. | 363/98 |
| 5,363,020 A | 11/1994 | Chen et al. | 315/209 |
| 5,384,516 A | 1/1995 | Kawabata et al. | 315/160 |
| 5,402,043 A | 3/1995 | Nilssen | 315/307 |
| 5,402,329 A | 3/1995 | Wittenbreder, Jr. | 363/16 |
| 5,412,557 A | 5/1995 | Lauw | 363/37 |
| 5,418,703 A | 5/1995 | Hitchcock et al. | 363/17 |
| 5,420,779 A | 5/1995 | Payne | 363/56 |
| 5,422,546 A | 6/1995 | Nilssen | 315/219 |
| 5,430,632 A | 7/1995 | Meszlenyi | 363/17 |
| 5,430,641 A | 7/1995 | Kates | 363/133 |
| 5,438,242 A | 8/1995 | Simpson | 315/219 |
| 5,448,155 A | 9/1995 | Jutras | 323/285 |
| 5,448,467 A | 9/1995 | Ferreira | 363/17 |
| 5,451,041 A | 9/1995 | Greive | 271/98 |
| 5,464,836 A | 11/1995 | Camaggi et al. | 514/239.2 |
| 5,481,160 A | 1/1996 | Nilssen | 315/209 |
| 5,481,163 A | 1/1996 | Nakamura et al. | 315/308 |
| 5,486,740 A | 1/1996 | Yamashita et al. | 315/308 |
| 5,495,405 A | 2/1996 | Fujimura et al. | 363/133 |
| 5,510,974 A | 4/1996 | Gu et al. | 363/134 |
| 5,514,921 A | 5/1996 | Steigerwald | 307/125 |
| 5,546,300 A | 8/1996 | Lee et al. | 363/132 |
| 5,559,688 A | 9/1996 | Pringle | 363/89 |
| 5,583,402 A | 12/1996 | Moisin et al. | 315/307 |
| 5,606,224 A | 2/1997 | Hua | 315/121 |
| 5,615,093 A | 3/1997 | Nalbant | 363/25 |
| 5,619,104 A | 4/1997 | Eunghwa | 315/159 |
| 5,619,402 A | 4/1997 | Liu | 363/20 |
| 5,638,260 A | 6/1997 | Bees | 363/17 |
| 5,646,836 A | 7/1997 | Sadarnac et al. | 363/98 |
| 5,652,479 A | 7/1997 | LoCascio et al. | 315/225 |
| 5,657,220 A | 8/1997 | Yan | 363/132 |
| 5,669,238 A | 9/1997 | Devers | 62/657 |
| 5,677,602 A | 10/1997 | Paul et al. | 315/224 |
| 5,684,683 A | 11/1997 | Divan et al. | 33/65 |
| 5,694,007 A | 12/1997 | Chen | 315/247 |
| 5,712,533 A | 1/1998 | Corti | 315/169.3 |
| 5,715,155 A | 2/1998 | Shahani et al. | 363/132 |
| 5,719,474 A | 2/1998 | Vitello | 315/307 |
| 5,719,759 A | 2/1998 | Wagner et al. | 363/132 |
| 5,731,652 A | 3/1998 | Shimada | 310/316 |
| 5,736,842 A | 4/1998 | Jovanivic | 323/222 |
| 5,742,495 A | 4/1998 | Barone | 363/65 |
| 5,742,496 A | 4/1998 | Tsutsumi | 363/95 |
| 5,744,915 A | 4/1998 | Nilssen | 315/209 |
| 5,748,457 A | 5/1998 | Poon et al. | 363/16 |
| 5,764,494 A | 6/1998 | Schutten et al. | 363/17 |
| 5,774,346 A | 6/1998 | Poon et al. | 363/17 |
| 5,781,418 A | 7/1998 | Chang et al. | 363/16 |
| 5,781,419 A | 7/1998 | Kutkut et al. | 363/17 |
| 5,784,266 A | 7/1998 | Chen | 363/16 |
| 5,796,598 A | 8/1998 | Norwalk et al. | 363/37 |
| 5,818,172 A | 10/1998 | Lee | 315/86 |
| 5,834,889 A | 11/1998 | Ge | 313/493 |
| 5,834,907 A | 11/1998 | Takehara | |
| 5,844,378 A | 12/1998 | LoCascio et al. | |
| 5,844,540 A | 12/1998 | Terasaki | 345/102 |
| 5,854,617 A | 12/1998 | Lee et al. | 345/102 |
| 5,856,916 A | 1/1999 | Bonnet | 363/20 |
| 5,870,298 A | 2/1999 | Hung | 363/98 |
| 5,875,103 A | 2/1999 | Bhagwat et al. | 363/17 |
| 5,880,940 A | 3/1999 | Poon | 363/20 |
| 5,886,477 A | 3/1999 | Honbo et al. | 315/209 |
| 5,886,884 A | 3/1999 | Back et al. | 363/48 |
| 5,894,412 A | 4/1999 | Faulk | 363/56 |
| 5,910,709 A | 6/1999 | Stevanovic et al. | 315/225 |
| 5,917,722 A | 6/1999 | Singh | 363/132 |
| 5,923,129 A | 7/1999 | Henry | 315/307 |
| 5,930,121 A | 7/1999 | Henry | 363/16 |
| 5,930,122 A | 7/1999 | Moriguchi et al. | 363/17 |
| 5,932,976 A | 8/1999 | Maheshwari et al. | 315/291 |
| 5,939,830 A | 8/1999 | Praiswater | 315/DIG. 4 |
| 5,946,200 A | 8/1999 | Kim et al. | 363/17 |
| 5,949,197 A | 9/1999 | Kastner | 315/291 |
| 6,002,210 A | 12/1999 | Nilssen | 315/219 |
| 6,011,360 A | 1/2000 | Gradzki et al. | 315/244 |
| 6,016,052 A | 1/2000 | Vaughn | 323/355 |
| 6,051,940 A | 4/2000 | Arun | 315/307 |
| 6,114,814 A | 9/2000 | Shannon et al. | 315/219 |
| 6,151,232 A | 11/2000 | Furuhashi et al. | 363/97 |
| 6,198,234 B1 | 3/2001 | Henry | 315/291 |
| 6,259,615 B1 | 7/2001 | Lin | 363/98 |
| 6,396,722 B2 | 5/2002 | Lin | 363/98 |
| 6,448,951 B1 | 9/2002 | Sakaguchi et al. | |
| 6,501,234 B2 | 12/2002 | Lin et al. | 315/307 |
| 6,804,129 B2 | 10/2004 | Lin | 363/98 |
| 6,815,906 B1 | 11/2004 | Aarons et al. | 315/209 |

FOREIGN PATENT DOCUMENTS

| | | |
|---|---|---|
| GB | 2213613 | 8/1989 |
| JP | 59032370 | 2/1984 |
| JP | 07211472 | 8/1995 |
| JP | 08288080 | 11/1996 |
| JP | 2733817 | 1/1998 |
| JP | H11-3039 | 1/1999 |
| JP | 11146655 | 5/1999 |

| | | |
|---|---|---|
| JP | 2000197368 | 7/2000 |
| WO | WO98/09369 | 3/1998 |

OTHER PUBLICATIONS

Linfinity Microelectronics Infinite Power of Innovation LXM1597-01 5V CCFL Inverter Modules Preliminary Data Sheet, Copyright 1995, Rev. 4 May 1996 pp. 5.

O2 Micro International Limited (Plaintiff) v. Samsung Electronics Co., LTD. (Defendant)- Case No. 2-04CV-323 JURY-Complaint for Patnet Infringement 47 pages Voltages and Frequencies (Single Phase), 1987, First Edition.

O2 Micro International Limited (Plaintiff) v. Samsung Electronics Co., LTD., Electronics America, Inc., Samsung SDI Co., LTD., and Samsung SDI America, Inc. (Defendants)- Case No. 2-04CV-323 (Ward) JURY-First Amended Complaint for Patent Infringement 7 pages.

O2 Micro International Limited (Plaintiff) v. Samsung Electronics Co., LTD., Samsung Electronics America, Inc., Samsung SDI Co., LTD., and Samsung SDI America, Inc. (Defendants)- Civil Action No. 2-04CV-323 (Ward) Defendants Samsung Electronics Co., Ltd. and Samsung Electronics America, Inc.'s Anser to Plaintiff's First Amended Complaint and Counterclaims 11 pages.

O2 Micro International Limited (Plaintiff) v. Samsung Electronics Co., LTD., Samsung Electronics America, Inc., Samsung SDI Co., LTD., and Samsung SDI America, Inc. (Defendants)- Case No. 2-04CV-323 JURY—Plaintiff O2 Micro International Limited's Reply to Counter-Defendants Samsung Electronics Co., Ltd's and Samsung Electronics America, Inc.'s Counterclaims 5 pages.

O2 Micro International Limited (Plaintiff) v. Samsung Electronics Co., LTD., Samsung Electronics America, Inc., Samsung SDI Co., LTD., and Samsung SDI America, Inc. (Defendants)- Civil Action No. 2-04CV-323 (Ward) Defendants Samsung SDI Co., Ltd. And Samsund SDI America, Inc.'s Answer to Plaintiff's First Amended Complaint, and Counterclaims 11 pages.

O2 Micro International Limited (Plaintiff) v. Samsung Electronics Co., LTD., Samsung Electronics America, Inc., Samsung SDI Co., LTD., and Samsung SDI America, Inc. (Defendants)- Case No. 2-04CV-323 JURY—Plaintiff O2 Micro International Limited's Reply to Defendants Samsung SDI C., Ltd. and Samsund SDI America, Inc.'s Counterclaims 5 pages.

O2 Micro International Limited (Plaintiff) v. Samsung Electronics Co., LTD., Samsung Electronics America, Inc., Samsung SDI Co., LTD., and Samsung SDI America, Inc. (Defendants)- Civil Action No. 2-04CV-323 TJW—Plaintiff O2 Micro International Limited's Opening Claim Construction Brief 50 Pages.

O2 Micro International Limited (Plaintiff) v. Samsung Electronics Co., LTD., Samsung Electronics America, Inc., Samsung SDI Co., LTD., and Samsung SDI America, Inc. (Defendants)- Civil Action No. 2-04CV-323 TJW—Plaintiff O2 Micro International Limited's Amended Opening Claim Construction Brief 50 Pages.

O2 Micro International Limited (Plaintiff) v. Samsung Electronics Co., LTD., Samsung Electronics America, Inc., (Defendants)- Civil Action No. 2-04CV-323 (TJW) JURY—Samsung Electronics Co., Ltd. And Samsung Electronics America, Inc.'s Responsive Brief on Claim Construction 44 pages.

O2 Micro International Limited (Plaintiff) v. Samsung Electronics Co., LTD., Samsung Electronics America, Inc., Samsung SDI Co., LTD., and Samsung SDI America, Inc. (Defendants)- Civil Action No. 2-04CV-323 Ward—Defendant Samsung Electronics Co., Ltd. and Samsung Electronics America, Inc.'s First Amended Answer 18 pages.

O2 Micro International Limited v. Samsung Electronics Co. Ltd., et al.—Civil Action No. 2-04-CV-323 Memorandum Opinion and Order 16 pages.

O2 Micro International Limited (Plaintiff) v. Samsung Electronics Co., Ltd. And Samsung Electronics America, Inc. (Defendants) Civil Action No. 2-04-CV-323 (Ward) Defendants Samsung Electronics Co., Ltd. And Samsung Electronics America, Inc.'s Second Amended Answer 19 pages.

O2 Micro International Limited (Plaintiff) v. Sansung Electronics Co., LTD, Samsung Electronics America, Inc., Samsung SDI Co., Ltd and Samsung SDI America, Inc. (Defendants)—Civil Action No. 2-04-CV-323 (Ward) Order Granting Samsung Electronics Co., Ltd. and Samsun Electronics America, Inc.'s Unopposed Motion for Leave to File A Second Amended Answer 1 page.

O2 Micro International Limited (Plaintiff) v. Samsung Electronics Co., Ltd. And Samsung Electronics America, Inc. (Defendants) Civil Action No. 2-04-CV-323 (Ward) Defendants Samsung Electronics Co., Ltd. And Samsung Electronics America, Inc.'s Unopposed Motion for Leave to File a Second Amended Answer 4 pages.

O2 Micro International Limited, (Plaintiff) v. Rohm Co., LTD, Consy Corporation, Sony EMCS Corporation, Sony Corporation of America, and Sony Electronics Inc. (Defendants) Case No. 2-05CV-211 Jury Trial Demanded Complaint for Patent Infringement 7 pages.

O2 Micro International Limited (Plaintiff) v. Rohm Co., LTD. Sony Corporation, Sony EMCS Corporation, Sony Corporation of America and Sony Electronics Inc. (Defendants) Case No. 2-05CV-211 DF E-Filing Special Appearance Defendant ROHM Co. LTD.'s Answer and Counterclaims to Plaintiff's Complaint 10 pages.

O2 Micro International Limited (Plaintiff) v. ROHM Co. Ltd. Sony Corporation, Sony EMCS Corporation, Sony Corporation of America and Sony Electronics, Inc. (Defendants Case No. 2-05CV-211 (Folsom) JURY-Sony Corporation, Sony EMCS Corporation, Sony Corporation of America and Sony Electronics Inc.'s Answer to O2 Micro's Complaint 29 pages.

Translation of Japanese Notification and Observations, Submitted on Jun. 9, 2003 to Commissioner of the Japanese Patent Office, Japanese Patent Application No. 2001-8143, Submitted by Hiromo Goto.

Translation of Japanese Notification and Observations, Submitted on Jun. 17, 2003 to the Director General of Patent Office, Japanese Patent Application No. 2001-8143, Submitted by Noriko Kido.

Translation of Japanese Notification and Observations, Submitted on Jun. 16, 2003 to the Director General of Patent Office, Japanese PAtent Application No. 2001-8143, Submitted by Mayuki Matsumae.

Preliminary Data sheet for MP1010 MPS 003586-3591, MPS Feb. 1999.

O2 Micro International Limited v. Monolithic Power Systems, Inc. U.S. Distric Eastern District of Texas (Marshall) Civil Docket for Case# 2:04-cv-00359-TJW Fate Filed Oct. 13, 2004.

U.S. District Court [LIVE] Eastern District of Texas Live (Marshall) Civil Docket for Case# 2:04-cv-00323-TJW Date Filed Sep. 3, 2004.

O2Micro International v. (1) Hon Hai Precision Industry Co., LTD, a/k/a Foxconn (2) Ambit Microsystems Corporation U.S. District Court Eastern District of Texas (Marshall) Case No.# 2:05-cv-323 date filed Jul. 18, 2005.

U.S. District Court [Live] Eastern District of Texas Live (Marshall) Civil Docket for Case No.# 2:05-cv-00211-TJW date filed Jun. 3, 2005.

U.S. District Court [Live] Eastern District of Texas Live (Marshall) Civil Docket for Case No.# 2:04-cv-00323-TJW date filed Sep. 3, 2004.

U.S. District Court Eastern District of Texas Live (Marshall) Civil Docket for Case No.# 2:03-cv-00007-TJW date filed Jan. 6, 2003. Docket Text and dated filed 1 page.

O2Micro International v. BiTek, SPI, FSP, Lien-Chang U.S. District Court eastern District of Texas (Marshall) Case # 2:04-cv-00032-TJW Date Filed Jan. 30, 2004 updated on Feb. 1, 2007.

U.S. District Court California Northern District (Oakland) Civil Docket for Case #4:06-cv-02929-CW Date Filed May 1, 2006 Related Case: 4:04-cv-2000-CW.

Monolithic Power Systems Inc v. O2Micro International U.S. District Court Northern District of California CASE# 4"04-cv-2000 Date Filed May 20, 2004.

O2Micro International v. BiTek, SPI, FSP, Lien-Chang U.S. District Court eastern District of Texas (Marshall) CASE# 2:04-cv-00032-TJW Date Filed Jan. 30, 2004 updated on Dec. 25, 2006.

U.S. District Court [Live] Eastern District of Texas Live (Marshall) Civil Docket for Case# 2:04-cv-00323-TJW Date Filed Sep. 3, 2004 Updated on Dec. 25, 2006.

Fuji Electric Chip data sheet dated Aug. 1999; SE 146960-75; SE 146944-59.

LinFinity Microelectronics LXM1640-01 "Direct Drive Quad Lamp CCFL Inverter Module" Product Data Sheet p. 1, 2 4, 5. 11861 Western Ave, Garden Grove, CA 92841 Copyright 1998.

Micro Lnear, Application Note 19, "Phase Modulated PWM Topology with the ML4818", By Mehmet K. Nalbant 16 pages.

Unitrode Products from Texas Instruments- "BiCMOS Cold Cathode Fluorescent Lamp Driver Controller." UCC1972/3-UCC2972/3-UCC3972/3 Oct. 1998-Revised Nov. 2000; 17 pages.

Product Innovations Electronic Design/Jul. 10, 1995, "DC-to-AC Inverter Ups CCFL Lumens per Watt", by Frank Goodenough-p. 44-48.

LinFinity Microelectronics LXM1653-01 "Floating Output Drive, CCFL Inverter Modules" p. 1-6 11861 Western Ave, Garden Grove, CA 92841.

"An Intelligent Inverter for a high-power LCD backlight" By, T. Yana, F. HANzawa, Y. Watanabe, Journal of the SID Jul. 3, 1999 p. 163-166.

BiTEK's Preliminary Invalidity Contentions for U.S. Patent 6,804,129-pp. 1-5.

MPS Monolithic Power Systems Inc. MP1011 Cold Cathode Fluorescent Lamp Driver 4 pgs.

MPS Monolithic Power Systems Inc. MP1010 Cold Cathode Fluorescent Lamp Driver 6 pgs.

Fairchild Semiconductor ML4818 Phase Modulation/Soft Switching Controller Rev 1.0 Oct. 10, 2000 12 pgs.

Resonant Fluorescent Lamp Converter Provides Efficient and Compact Solution 0-7803-0982-/93 $3.00 1993 IEEE pp. 424-431.

Integrated Circuits Unitrode Resonant Fluorescent Lamp Driver UC1871 UC2871 UC3871 6 pgs.

A New CCFL Inverter Circuit for AMLCD Panels Results in Significantly Higher Efficiency and Brightness. Mehmet Nalbant Linfinity Microelectronics AMLCD 1995 4 pgs.

OZ962-DS-010 "High Efficiency Inverter Controller" MPS 093340-MPS 093349—O2 Micro Breathing Life into Computing 10 pages.

"Resonant Inverters and Their Application to Electronics Ballasts and High Voltage Power Conversions" By, Yung-Lin Lin A Dissertation Submitted to the Faculty of the Department of Electrical and Computer Engineering. In Partial Fulfillment of the Requirements for the degree of Doctor of Philosophy in the Graduate College The University of Arizona 1996—243 pages.

"Class DE Inverters and Rectifiers for DC—DC Converters" by David C. Hamill; Department of Electronics Engineering University of Surrey, Guildford GU2 5XH, United Kingdom 8 pages.

"ARC Discharge Supply Component Protection Circuitry" A.F. Ahrens and G. L. Cardwell, Space and Communications Group, Hughes Aircraft Company, El Segundo, California, p. 326-333.

Design of a 10 kW, 500 kHz Phase-Shift Controlled Series-Resonant Inverter for Induction Heating L. Grajales, J.A. Sabate, K.R. Wang, W.A. tabisz and F.C. Lee pp. 843-849.

A Phase-Difference Angle Control-Mode PWM High-Frequency Resonant Inverters Using Static Induction-Transistors and-Thyristors M. Nakatoka, T. Maruhashi, T. Koga, S. Sugawara and T. Nishimura, Department of Electrical Engineering, Kobe University, Kobe 657 Japan 0275-9306/87/0000-0674 $1.00 1987 IEEE 674-681.

Linfinity Microelectronics LXM1592/LXM1593 Floating Output Drive Customizable CCFL Inverter Modules Preliminary Data Sheet 15 pgs.

Development of the Versatile Electronic Ballast for Metal Halide Lamps with Phase-Shift Soft-Switching Control, C.L. Tsay, H.S. Chun, L.M. Wu, K.S. Kwan Energy & Resources Laboratories Industrial Technology Research Institute Chutung Hisnschu Taiwan R.O.C. 0-7803-3544-9/96 $5.00 1996 IEEE pp. 2112-2119.

Micro Linear ML4877 Feb. 1997 Databook LCD Backlight Lamp Driver 8 pgs.

Micro Linear ML4878 Feb. 1997 Databook LCD Backlight Lamp Driver 8 pgs.

Fairchild Semiconductor Application Note 42010 George A Hall and Urs Mader, Theory and Application of the ML4874 and ML4876 LCD Backlight Controller ICs Jun. 1996 Rev. 01 Oct. 25, 2000 12 pgs.

Unitrode Application Note U-162 Ron Florello Unitrode Corporation, Driving a 35W AC Metal Halide High Intensity Discharge Lamp with the UCC3305 HID Lamp Controller 13 pgs.

Integrated Circuits Unitrode HID Lamp Controller UCC2305 UCC3305 8 pgs.

The LCC Inverter as a Cold Cathode-Fluorescent Lamp Driver, Joel A. Donahue, P.E. and Mialn M. Jovanovic, DELTA Power Electronics Lab, 0-7803-1456-5/94 $4.00 1994 IEEE 7 pgs.

IEEE Transactions on Industrial Electronics vol. 42, No. 1 Feb. 1995, Analysis and Design-Optimization of LCC Resonant Inverter for High-Frequency AC Distributed Power System J.A. Sabate, M.M. Jovanovic, Senior Member, IEEE F.C. Lee, Fellow, IEEE and R.T. Gean pp. 63-71.

A Low-Cost Control IC for Single-Transistor ZVS Cold-Cathode Fluorescent Lamp Inverters and DC/DC Converters, Richard Redl, ELFI S.A. Derrey-la-Cabuche CH-1756 Onnens FR Switzerland, Koji Arakawa Toko, Inc. 18 Oaza Gomigaya Tsurugashimashi Saitama 350-02 Japan 8 pgs.

Modern DC-to-DC Switchmode Power Converter Circuits, Rudolf P. Severns President Sprintime Enterprises Inc. Bloom Associates Inc. Gordon (ed) Bloom Copyright 1985 By Rudolph R. Severns and Gordon Bloom 4 pgs.

Switch Mode Power Conversion Basic Theory and Design by K.Kit Sum Chief Engineer LH Research Inc. Tustin, California. Markel Dekker Inc, New York and Basel Copyright 1984 3 pgs.

EDN The Design Magazine of the Electronic Industry Feb. 15, 1996 Out in Front Whats Hot in the Design Community Edited by Fran Granville. Reprinted from EDN by Cahners Publishing Company 1996 1 page.

Testing and Analysis of CS-ZVS Bases Floating and Non-Floating CCFL Inveters and Modeling of the Lamp to Panel Leakage Currents, Mehmet K. Nalbant Linfinity Microelectronics 9 pgs.

IEEE Transactions of Power Electronics vol. 13 No. 3 May 1998, Analysis, Design, and Optimization of the LCC Resonant Inverter as a High-Intensity Discharge Lamp Ballast J. Marcos Alonso, Member IEEE, Cecilio Blanco, Member IEEE, Emilio Lopez, Antonio J. Calleja, Student Member, IEEE, and Manuel Rice, Member IEEE pp. 573-585.

Pulsewidth Modulation Control of Electronic Ballas for Dimming Control of Fluorescent Lamps, Christian Branas, Francisco J. Azcondo, Salvador Bracho, Department of Electronics Technology, System Engineering and Automation University of Cantabria 39005 Sanunder, Spain pp. 537-542.

Switched Mode Transistor Amplifiers M.L. Stephens Member IEEE J.P. Wittman Senior Member IEEE, Sep. 1963 pp. 3.

Resonant Power Converters, Marian Kazimierczuk Wright State Univeristy, Dariusz Czarkowski University of Florida Copyright 1995 by John Wiley & Sons, Inc. 5 pgs.

Notice of Reasons for Rejection; Mailing date Nov. 2, 2004, Mailing No. 401750 Ref. No. F08427A1, Application No. 2001-008143 10 pages.

Decision of Rejection; mailing date May 24, 2005, Mailing No. 184858 Ref No. F08427A1 Application No. 2001-008143 2 pages.

Japanese Notification & Observation document 2001-008143 18 pages.

English Translation of p. 38 of Citation 6; Shiga International patent Office 3 pages.

Fuji Electrics Development Specifications; 2001-008143 16 pages.

Data Sheet (74HC/HCT4046A) Philips Semiconductors, Nov. 25, 1997.

Translation of Provisional Rejection dated Sep. 5, 2005 from the Korean Intellectual Property Office. Notice of Provisionally Rejection Application No. 2001-0001901.

Chinese Encyclopedia of Electrical, pp. 564-565, Aug. 1994, Taipei Taiwan.

English translation of Cancellation Brief filed by Monolithic Power Systems, Inc. in corresponding Taiwan Patent No. NI-152318, 7 pages.

English Translation of Defense Statement filed by O2 Micro International Limited in response to Cancellation Brief filed by Monolithic Power Systems, Inc. submitted on May 20, 2003, 9 pages.

English Translation of Supplementary Cancellation Brief filed my Monolithic Power Systems, Inc. submitted on Nov. Nov. 11, 2003, 19 pages.

English Translation of Supplementary Defense Statement filed by O2 Micro International Limited submitted on Jan. 19, 2004, 15 pages.

English Translation of Cancellation Brief filed by Beyond Innovation Technology Co., in corresponding Patent No. NI-152318, 12 pages.

English Translation of Abstract of Taiwan patent No. 357481, submitted by Beyond Innovation Technology Co., Ltd. in Cancellation Brief.

English Translation of Defense Statement filed by O2Micro International Limited in response to Cancellation Brief filed by Beyond Innovation Technology Co., LTD., submitted on May 18, 2004, 12 pages.

English Translation of Cancellation Brief filed by Mr. Tsan-Jung Chen in corresponding Taiwan Patent No. NI-152318, 58 pages.

English Translation of Power Electronics: Converters, Applications and Designs, pp. 10-49 to 10-50, 2 pages cited by Mr. Tsan-Jung Chen in Cancellation Brief.

English Translation of Defense Statement by O2Micro International Limited in response to Cancellation Brief filed by Mr. Tsan-Jung Chen, submitted on May 30, 2003, 14 pages.

English Translation of Supplementary Defense Statement by O2Micro International Limited in response to Cancellation Brief filed by Mr. Tsan-Jung Chen, submitted on Mar. 19, 2004, 12 pages.

Summary Translation of Taiwanese Office Action in corresponding Taiwanese Application No. 089114672N01, 2 pages.

Supplementary Defense Statement for ROC Pat Application. No. 089114672N01 Submitted on May 6, 2005; Title High-Efficiency Adaptive DC/AC Converter.

Supplementary Defense Statement for ROC Pat Application. No. 089114672N02 Submitted on May 6, 2005; Titled "High-Efficiency Adaptive DC/AC Converter".

Supplementary Defense Statement for ROC Pat Application. No. 089114672N03 Submitted on Apr. 29, 2005; Titled "High-Efficiency Adaptive DC/AC Converter".

Cancellation Decision of the Intellectual Property Office Patent Application No. under Cancellation: 089114672N01: Issuance Date May 26, 2005.

Cancellation Decision of the Intellectual Property Office Patent Application No. under Cancellation: 089114672N02: Issuance Date May 26, 2005.

Cancellation Decision of the Intellectual Property Office Patent Application No. under Cancellation: 089114672N03: Issuance Date May 26, 2005.

Dierberger, Ken, "A New Generation of Power MOSFET Offers Improved Performance as Reduced Cost." Application Note APT9703, Advanced Power Technology Inc., Dec. 1997: 1-12.

Andreycak, Bill, "Phase Shifted Zero Voltage Transition Design Considerations and the UC3875 PWM Controller." Application Note U-136A, Unitrode Corp., SLUA-May 1997: 1-14.

"Phase Shift Resonant Controller." Application Note US1879, UC2879, UC3879, Unitrode Corp., Jun. 1998: 1-6.

"CCFL Inverter Design AN01 Using MP1010", Microtek Inc., 1st Marketing Section, vol. 11, 5/99, Sep. 1999: 1-7.

"Zero-Voltage Switching Technique in DC/DC Converters", Kwang-Hwa Liu and Fred C. Lee, Department of Electrical Engineering, Virginia Polytechnic Institute and State University. 1986 IEEE, Reprinted with permission; PESC 86; Vancouver BC, Jun. 23-27, 1986; pp. 58-70.

"A Comparative Study of a Class of Full Bridge Zero-Voltage-Switched PWM Converters" W.Chen, F.C. Lee, M.M. Jovanovic and J.A. Sabate 1995 IEEE, pp. 893-899. Virginia Power Electronics Center, The Bradley Department of Electrical Engineering.

"A Frequency/PWM Controlled Converter with Two Independently Regulated Outputs" R.A. Fisher. R.L. Steigerwald, C.F. Saj, GE Corporate Research and Development Center, HFPC May 1989 Proceedings pp. 459-471.

"A New and Improved Control technique Greatly Simplifiers the Design of ZVS Resonant Inverters and DC/DC Power Supplies" Memet Nalbant, Linfinity Microelectronics (formerly Silicon General), 1995 IEEE, pp. 694-701.

"An Introduction to the Principles and Features of Resonant Power Conversion" Steve Freeland; Rockwell International Corporation, Autonetics ICBM Systems Division. pp. 20-43.

"Switching Power Supply Design" Abraham I. Pressman, Copyright 1991, by McGraw-Hill inc, Chapter 3 pp. 93-104, Chapter 13 pp. 471-492.

"Feasible Characteristics Evaluations of Resonant Tank PWM Inverter-Linked DC—DC High-Power Converters for Medical-Use High-Voltage Applications", H. Takano, J. Takahashi, M. Nakaoka. 1995 IEEE; pp. 913-919.

"Fixed-Frequency, Resonant-Switched Pulse Width Modulation with Phase-Shifted Control", Bob Mammano and Jeff Putsh, Sep. 1991, pp. 5-1thru 5-7.

"High Density Power-Hybrid Design of a Half-Bridge Multi-Resonant Converter", Richard Farrington, et al. May 1990. Proceedings pp. 26-33.

Optimum ZVS Full-bridge DC/DC Converter with PWM Phase-Shift Control: Analysis, Design Considerations, and Experimental Results, Redl, et al. 1994 IEEE, pp. 159-165.

Unitrode Application Note U136, Phase Shifted, Zero Voltage Transition Design Considerations and the UC3875 PWM Controller Bill Andreycak, SLUA107 May 1997 pp. 1-14.

"Zero-Voltage Switching Resonant Power Conversion" Bill Andreycak, pp. A2-1 thruA2-3A.

"Resonant Mode Converter Topologies" Bob Mammano, pp. P3-1 thruP3-12.

"Small-Signal Analysis of the Zero-Voltage Switched Full-Bridge PWM Converter", V. Vlatkovic, et al. HFPC May 1990 Proceedings, pp. 262-269.

Unitrode Corporation U154, "The New UC3879 Phase-Shifted PM Controller Simplifies the Design of Zero Voltage Transition Full-Bridge Converters", Laszlo Balogh, pp. 1-8.

Shiga International Patent Office, English Translation of Citation 8 (CCFL Inverter Design AN01 Using MP1010), Monolithic Power Systems Inc. Excerpt from MSP Co. Applications Notes AN01 v.11 May 1999 pp. 1-7.

MPS Monolithic Power Systems, Inc. "Cold Cathode Fluorescent lamp" MP1010 Preliminary Data Sheer V.2 Feb. 1999 pp. 1-6.

United States Disctrict Court Eastern District of Texas Marshall Division, O2 Micro International Limited V. Monolithic Power Systems Inc, Monolithic power Systems Inc's Answer to first Amended Complaint; Counterclaims; Dec. 13, 2004 pp. 1-17.

LG Philips LCD Specification for Approval Liquid Crystal Display, LC300W01 Titled"30.0 WXGA TFT LCD" pp. O2 615 009475-O2 615 009502.

LG Philips LCD Specification for Approval Liquid Crystal Display, LM181E1-H2MN Titled"18.1 SXGA TFT LCD" pp. O2-615 009398-O2 615 009421.

Official Monthly Publication of the Society for Information Display, Nov. 1989 vol. 5, No. 11 pp. ERI 009217-ERI 009223.

LG Philips LCD Specification for Approval Liquid Crystal Display, LB121S1-A2 Titled"12.1 SVGA TFT LCD" pp. O2 615 009226-O2 615 009247.

LG Philips LCD Specification for Approval Liquid Crystal Display, BLB121S1-N Titled"12.1 SVGA TFT LCD" pp. O2 615 009248-O2 615 009271.

Bi-Search International, Inc. BLB121S1-S Specification for Approval Titled"12.1 SVGA TFT LCD" pp. O2 615 00272-O2 615 009295.

LG Philips LCD Specification for Approval Liquid Crystal Display, LM151X05 Titled"15.1 XGA TFT LCD" pp. O2-615 009296-O2 615 009319.

LG Philips LCD Specification for Approval Liquid Crystal Display, LC151X01 Titled"15.1 XGA TFT LCD" pp. O2-615 009320-O2 615 009371.

LG Philips LCD Specification for Approval Liquid Crystal Display, LM181E06 Titled"18.1 SXGA TFT LCD" pp. O2-615 009372-O2 615 009397.

LG Philips LCD Specification for Approval Liquid Crystal Display, LM201U1-A3 Titled"20.1 UXGA TFT LCD" pp. O2-615 009422-O2 615 009448.

LG Philips LCD Specification for Approval Liquid Crystal Display, LM220W1-A2MN Titled"22.0 WSXGA TFT LCD" pp. O2-615 009449-O2 615 009474.

Advanced Power Technology, Ken Dierberger, APT9703, Application Note "A New Generation of Power MOSFET Offers Improved Performance at Reduced Cost" pp. 1-32.

United States District Court for the Northern District of California. Case No. C-00-4071 CW and C-01-3995 CW Order Construing Disputed Claims and Terms O2 Micro International Limited v Monolithic Power Systems, Inc & Monolithic Power Systems, Inc V. O 2 Micro International Limited (Counterclaims) Dated Dec. 27, 2002. United States District Court Northern District of California San Francisco Division. Case No. C 01 3995 JCS ADR Monolithic Power Systems Answer to the First Amended Complaint and Counterclaim O2 Micro International Limited v Monolithic Power Systems, Inc & Monolithic Power Systems, Inc V. O 2 Micro International Limited (Counterclaims) Dated Dec. 5, 2001.

United States Disctrict Court Northern District of California Oakland Division. Case No. CV-00-4071 CW and CV-01-3995 Defendant Monolithic Power Systems Final Invalidity Contentions O2 Micro International Limited v Monolithic Power Systems, Inc & Monolithic Power Systems, Inc V. O 2 Micro International Limited (Counterclaims) Dated Feb. 5, 2003.

United States Disctrict Court Northern District of California Oakland Division. Case No. CV-00-4071 CW (EDL) Defendant Monolithic Power Systems Preliminary Invalidity Contentions O2 Micro International Limited v Monolithic Power Systems, Inc & Monolithic Power Systems, Inc V. O 2 Micro International Limited (Counterclaims) Dated Jun. 7, 2002.

United States Disctrict Court Northern District of California Oakland Division. Case No. DV-00-4071 CW and CV-01-3995 CW Defendant and Counterclaimant Monolithic Power Systems Responsive Claim Construction Brief O2 Micro International Limited v Monolithic Power Systems, Inc & Monolithic Power Systems, Inc V. O 2 Micro International Limited (Counterclaims) Dated Sep. 6, 2002.

United States Disctrict Court Northern District of California Oakland Division. Case No. CV-00-4071 CW and CV-01-3995 CW Defendant and Counterclaimant Monolithic over Systems Surreply Claim Construction Brief O2 Micro International Limited v Monolithic Power Systems, Inc & Monolithic Power Systems, Inc V. O 2 Micro International Limited (Counterclaims) Dated Sep. 20, 2002.

United States District Court Northern District of California Oakland Division Case No. C 04-2000 CW)Lead Case) Case No. C 06-02929 O2 Micro International Limited's Response and Objections to Monolithic Power Systems, Inc's First Set of Requests for Asmission (Nos. 1-154).

Case No. C04 02000: *Monolithic Power Systems, Inc. v O2 Micro International Ltd.*-- Complaint for Declaratory Judgement Document 1, filed May 20, 2004 total 6 pages.

Case No. 4:04-cv-02000-CW: *Monolithic Power Systems, Inc. v. O2 Micro International.*-- Answer to O2 Micro's First Amended Counterclaim Document 22 Filed Sep. 14, 2004 total 5 pages.

Case No. 4:04-cv-02000-CW: *Monolithic Power Systems, Inc. v. O2 Micro International Ltd.* -- Motion and Brief in Support of Monolithic Power Systems' Motion for Summary Judgment that the Claims of the O2 Micro '722 Patent are not Valid Document 132 Filed Mar. 21, 2006 total 26 pages.

Case No. 4:04-cv-02000-CW: *Monolithic Power Systems, Inc. v. O2 Micro International Ltd.*-- Reply in Support of Monolithic Power Systems' Motion for Summary Judgment that the Claims of the O2 Micro '722 Patent are not Valid Document 161 Filed Apr. 11, 2006 total 17 pages.

Case No. 4:04-cv-02000-CW: *Monolithic Power Systems, Inc. v. O2 Micro International Ltd.* -- Joint Claim Construction and Prehearing Statement [Patent L.R.4-3] and Exhibit A-J Document 172 and 172-2 -172-11 Filed Apr. 20, 2006 total 237 pages.

Case No. 4:04-cv-02000-CW: *Monolithic Power Systems, Inc. v. O2 Micro International Ltd.*-- Monolithic Power Systems, Inc.'s First Amended Answer to O2 Micro International Limited's First Amended Counterclaim Document 286 Filed Aug. 3, 2006 total 12 pages.

Case No. 4:04-cv-02000-CW (consolidated with C 06-2929): *Monolithic Power Systems, Inc. v. O2 Micro International Ltd.* -- Monolithic Power Systems, Inc's, Michael Hisng's Advanced Semiconductor Manufacturing Company, Ltd.'s, Asustek Computer, Inc.'s, and Compal Electronics, Inc.'s (1) Motion for Summary Judgment, (2) Oppositeion to Motion for Summary Judgment, and (3) Claim Construction Brief Document 363-1 Filed Sep. 1, 2006 total 48 pages.

Case No. 4:04-cv-02000-CW (consolidated with C 06-2929): *Monolithic Power Systems, Inc. v. O2 Micro International Ltd.* -- O2 Micro International Limited's (1) Reply in Support of Motion for Summary Judgment, (2) Reply Claim Construction Brief and (3) Oppositeion to Defendants' Motions for Summary Judgment Document 417 Filed Sep. 15, 2006 total 40 pages.

Case No. 4:04-cv-02000-CW (consolidated with C 06-2929): *Monolithic Power Systems, Inc. v. O2 Micro International Ltd.* -- Monolithic Power Systems, Inc.'s, Michael Hisng's, Advanced Semiconductor Manufacturing Company, Ltd.'s, Asustek Computer, Inc.'s, and Compal Electronics, Inc.'s Reply Memorandum in Support of Motion for Summary Judgment Document 504 Filed Sep. 29, 2006 total 27 pages.

Case No. 4:04-cv-02000-CW (consolidated with C 06-2929): *Monolithic Power Systems, Inc. v. O2 Micro International Ltd.* -- Order on Claim Construction and Cross-Motions for Summary Judgment Document 741 Filed Feb. 8, 2007 total 30 pages.

Case No. 4:04-cv-02000-CW (consolidated with C 06-2929): *Monolithic Power Systems, Inc. v. O2 Micro International Ltd.* -- Monolithic Power Systems, ASMC, and Asustek's Motion for Leave to File a Motion for Reconsideration of Order Denying MPS' Motion for Summary Judgment of Invalidity of the '722 Patent and Denying Asustek's Motion for Summary Judgment Document 778 Filed Mar. 1, 2007 total: 10 pages.

Case No. 4:04-cv-02000-CW (consolidated with C 06-2929): *Monolithic Power Systems, Inc. v. O2 Micro International Ltd.* -- Civil L.R. 7-9(B)(2) Motion for Reconsideration of Claim Construction Ruling and for Further Construction in View of New Intrinsic Evidence Submitted in Pending Reexamination Proceedings Document 804 Filed Mar. 15, 2007 total 13 pages.

Case No. 4:04-cv-02000-CW (consolidated with C 06-2929): *Monolithic Power Systems, Inc. v. O2 Micro International Ltd.* -- Asustek's Motion for Partial Reconsideration of Order Denying its Motion for Summary Judgment Document 808 Filed Mar. 19, 2007 total 5 pages.

Case No. 4:04-cv-02000-CW (consolidated with C 06-2929): *Monolithic Power Systems, Inc. v. O2 Micro International Ltd.*-- Reply in Support of Defendants' Motion for Reconsideration of Order on Claim Construction Document 818 Filed Mar. 27, 2007 total 19 pages.

Case No. 4:04-cv-02000-CW (consolidated with C 06-2929): *Monolithic Power Systems, Inc. v. O2 Micro International Ltd.* -- Corrected reply in Support of Defendants' Motion for Reconsideration of Order on Claim Construction Document 821 Filed Mar. 27, 2007 total 19 pages.

Case No. 4:04-cv-02000-CW (consolidated with C 06-2929): *Monolithic Power Systems, Inc. v. O2 Micro International Ltd.* -- Reply to O2 Micro's Opposition to Asustek Computer, Inc.'s Motion for Partial Reconsideration of Order Denying Motion for Summary Judgment Document 824 Filed Mar. 28, 2007 total 8 pages.

Case No. 4:04-cv-02000-CW (consolidated with C 06-2929): *Monolithic Power Systems, Inc. v. O2 Micro International Ltd.* -- Defendants' Monolithic Power Systems, ASMC, Asustek, Compal, and Michael Hisng's Discovery Designations Document 850 filed Apr. 10, 2007 total 8 pages.

Case No. 4:04-cv-02000-CW (consolidated with C 06-2929): *Monolithic Power Systems, Inc. v. O2 Micro International Ltd.* -- Joint Pretrial Conference Statement (Jury Trial) Document 857 Filed Apr. 10, 2007 total 41 pages.

Case No. 4:04-cv-02000-CW (consolidated with C 06-2929): *Monolithic Power Systems, Inc. v. O2 Micro International Ltd.* -- Defendants' Motion for a Determination as a Matter of Law That O2 Micro has No Evidence of the Required Nexus Between the Asserted Patent Claims and (1) the Commercial Success of its Products, (2) Copying; or (3) any Other Secondary Consideration of Non-Obviousness Document 998 Filed May 9, 2007 total 8 pages.

Case No. 4:04-cv-02000-CW (consolidated with C 06-2929): *Monolithic Power Systems, Inc. v. O2 Micro International Ltd.* -- Defendants's Monolithic Power Systems, ASMC, Asustek, Compal's Conditional Motion for Judgement as a Matter of Law of Invalidity Due to MPS's Prior Invention Date; Motion to Strike Testimony and Evidence Document 1002 Filed May 10, 2007 total 10 pages.

Case No. 4:04-cv-02000-CW (consolidated with C 06-2929): *Monolithic Power Systems, Inc. v. O2 Micro International Ltd.* -- Motion for Judgment as a Matter of Law That the Asserted Claims of the '722 Patent are Obvious Document 1009 Filed May 10, 2007 total 6 pages.

Case No. 4:04-cv-02000-CW (consolidated with C 06-2929): *Monolithic Power Systems, Inc.* v. *O2 Micro International Ltd.* -- O2Micro International Limited's Proposed Construction of "Phase Overlap"Document 1015 Filed May 10, 2007 total 3 pages.

Case No. 4:04-cv-02000-CW (consolidated with C 06-2929): *Monolithic Power Systems, Inc.* v. *O2 Micro International Ltd.* -- Defendants' Oppositeion to Motion to Preclude Reference to Oz Datasheets or Products as Prior Art Document 1033-1 Filed May 13, 2007 total 4 pages.

Case No. 4:04-cv-02000-CW (consolidated with C 06-2929): *Monolithic Power Systems, Inc.* v. *O2 Micro International Ltd.* -- Verdict Form Document 1045 Filed May 15, 2007 5 pages.

Case No. 4:04-cv-02000-CW (consolidated with C 06-2929): *Monolithic Power Systems, Inc.* v. *O2 Micro International Ltd.* -- Expert Report of Mark N. Horenstein, Ph.D., P.E. May 5, 2006 total 147 pages.

Case No. 4:04-cv-02000-CW (consolidated with C 06-2929): *Monolithic Power Systems, Inc.* v. *O2 Micro International Ltd.*-- Expert Report of Jonathan R. Wood, May 5, 2006 total 78 pages.

Case No. 4:04-cv-02000-CW (consolidated with C 06-2929): *Monolithic Power Systems, Inc.* v. *O2 Micro International Ltd.*-- Expert Report of Lawrence J. Goffney May 5, 2006 total 52 pages.

Case No. 4:04-cv-02000-CW (consolidated with C 06-2929): *Monolithic Power Systems, Inc.* v. *O2 Micro International Ltd.*-- Expert Report of the Hornorable Gerald J. Mossinghoff, May 5, 2006 total 48 pages.

Case No. 4:04-cv-02000-CW (consolidated with C 06-2929): *Monolithic Power Systems, Inc.* v. *O2 Micro International Ltd.*-- U.S. District Court Northern District of California Docket Sheet for Case #: 4:05-CV-2000 last entry date Jun. 25, 2007 total 185 pages.

Case No. 4:04-cv-02000-CW (consolidated with C 06-2929): *Monolithic Power Systems, Inc.* v. *O2 Micro International Ltd.*-- Monolithic Power Systems, Inc's and Advanced Semiconductor Manufacturing Corporation Ltd.'s Supplemental Invalidity Contentions Apr. 5, 2006 total 296 pages.

Case No. 4:04-cv-02000-CW (consolidated with C 06-2929): *Monolithic Power Systems, Inc.* v. *O2 Micro International Ltd.*-- MPS, Asustek, ASMC, and Compal's Disclosure Pursuant to 35 U.S.C§ 282 Mar. 30, 2007 total 14 pages.

Case No. 2:04-CV-359-TJW: *O2 Micro International Limited* v. *Monolithic Power Systems, Inc.* -- Complaint for Patent Infringement Document 1, Filed Oct. 12, 2004 total 26 pages.

Case No. 2:04CV-359-TJW: *O2 Micro International Limited* v. (1) *Monolithic Power Systems, Inc.*; (2) Compal Electronics, Inc.; (3) Compal Information (Kunshan) Co., Ltd; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; (8) Advanced Semiconductor Manufacturing Corporation Limited -- First Amended Cmoplaint for Patent Infringement Document 9-1 Filed Dec. 6, 2006 total 10 pages.

Case No. 2:04-CV-359-TJW: *O2 Micro International Limited* v. (1) *Monolithic Power Systems, Inc.* -- Monolithic Power Systems, Inc.'s Answer to First Amended Complaint; Counterclaims Document 12 Filed Dec. 13, 2004 total 17 pages.

Case No. 2:04-CV-359-TJW: *O2 Micro International Limited* v. (1) *Monolithic Power Systems, Inc.*; (2) Compal Electronics, Inc.; (3) Compal Information (Kunshan) Co., Ltd.; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; (8) *Advanced Semiconductor Manufacturing Corporation Limited Compal Products Inc.* v. *Monolithic Powers Systems, Inc.; Delta electronics, Inc.; Delta Prodicts Corporation* -- Compal Electronics, Inc.'s First Amended Answer to Plaintiff's First Amended Complaint for Patent Infringement Document 53 Filed Aug. 29, 2005 total 21 pages.

Case No. 2:04-CV-359-TJW: *O2 Micro International Limited* v. (1) *Monolithic Power Systems, Inc.*; (2) Compal Electronics, Inc.; (3) Compal Information (Kunshan) Co., Ltd.; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; (8) Advanced Semiconductor Manufacturing Corporation Limited; and (9) Michael Hisng - Second Amended Complaint for Patent Infringement and Unfair Competition Document 112 Filed Nov. 18, 2005 total 12 pages.

Case No. 2:04-CV-359-TJW: *O2 Micro International Limited* v. (1) *Monolithic Power Systems, Inc,*; (2) Compal Electronics, Inc.; (3) Compal Information (Kunshan) Co., Ltd.; (4) Compal Electronics technology (Kunshan) Co., Ltd., (5) Asustek Computer Inc.; (6) Asustek Computer (Suzhou) Co., Ltd.; (7) Asustech (Suzhou) Co., Ltd.; (8) Advanced Semiconductor Manufacturing Corporation Limited; and (9) Michael Hisng *Compal Electronics, Inc.* v. *Monolithic Power Systems, Inc.*, (10) Delta Electronics, Inc.; and (11) Delta Products Corporation -- Compal Electronics, Inc.,'s Answer to Plaintiff O2Micro International Limited's Second Amended Complaint Document 117-1 Filed Dec. 2, 2005 total 19 pages.

Case No. 2:04-CV-359-TJW: *O2 Micro International Limited* v. (1) *Monolithic Power Systems, Inc,*; (2) Compal Electronics, Inc.; (3) Compal Information (Kunshan) Co., Ltd.; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; (8) Advanced Semiconductor Manufacturing Corporation Limited -- Joint Claim Construction and Prehearing Statement and Exhibit A - F Document 120 Filed Dec. 2, 2005 total 57 pages.

Case No. 2:04-CV-359-TJW: *O2 Micro International Limited* v. *Monolithic Power Systems, Inc. et al.*, -- Monolithic Power Systems, Inc.'s Answer to Delta Electronics, Inc.'s Cross-Complaint, Counterclaim Against Delta Electronics, Inc., and Third Party Complaint Against O2 Micro International Limited Document 125 Filed Dec. 19, 2005 total 15 pages.

Case No. 2:04-CV-359-TJW: *O2 Micro International Limited* v. *Monolithic Power Systems, Inc. et al., Compal Electronics, Inc.* v. *Monolithic Power Systems, Inc.*; Delta Electronics, Inc.; Delta Products Corporation *Delta Electronics, Inc.* v. *Monolithic Power Systems, Inc. and Compal Electronics, Inc.*, -- Monolithic Power Systems, Inc.'s Amended Answer to Delta Electronics, Inc.'s Cross-Complaint, Amended Counterclaim Against Delta Electronics, Inc. and Amended Third Party Complaint Against O2 Micro International Limited Document 139 Filed Jan. 9, 2006 total 16 pages.

Case No. 2:04CV-359-TJW: *O2 Micro International Limited* v. *Monolithic Power Systems, Inc. et al.*, -- Defendant Monolithic Power Systems, Inc.'s Answer to Second Amended Complaint; Counterclaims Document 144 Filed Jan. 9, 2006 total 23 pages.

Case No. 2:04-CV-359-TJW: *O2 Micro International Limited* v. *Monolithic Power Systems, Inc. et al.*, -- Defendant Michael Hsing's Answer to Second Amended Complaint Document 145 Filed Jan. 9, 2006 total 11 pages.

Case No. 2:04-CV-359-TJW: *O2 Micro International Limited* v. *Monolithic Power Systems, Inc. et al.*, -- Defendants' Responsive Claim Construction Brief Document 149 Filed Jan. 17, 2006 total 38 pages.

Case No. 2:04-CV-359-TJW: *O2 Micro International Limited* v. (1) *Monolithic Power Systems, Inc,*; (2) Compal Electronics, Inc.; (3) Compal Information (Kunshan) Co., Ltd.; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; (8) Advanced Semiconductor Manufacturing Corporation Limited -- Plaintiff O2 Micro International Limited's Reply Claim Construction Brief Document 163 Filed Jan. 26, 2006 total 38 pages.

Case No. 2:04-CV-359-TJW: *O2 Micro International Limited* v. *Monolithic Power Systems, Inc. et al.*, -- Motion and Brief in Support of Asustek Computer, Inc.'s Motion for Summary Judgment Document 169 Filed Feb. 3, 2006 total 30 pages.

Case No. 2:04CV-359-TJW: *O2 Micro International Limited* v. *Monolithic Power Systems, Inc. et al.*, -- Reply in Support of Asustek Computer, Inc.'s Motion for Summary Judgment Document 196 Filed Mar. 10, 2006 total 20 pages.

Case No. 2:04CV-359-TJW: *O2 Micro International Limited* v. *Monolithic Power Systems, Inc. et al.*, -- Michael Hisng's Preliminary Invalidity Contentions and Monolithic Power Systems, Inc.'s Asustek Computer Inc.'s and Advanced Semiconductor Manufacturing Corporation Ltd.'s Supplemental Invalidity Contentions Mar. 31, 2006 total 31 pages.

Case No. 2:04CV-359-TJW: *O2 Micro International Limited* v. *Monolithic Power Systems, Inc. et al.*, -- U.S. District Court Eastern District of Texas (Marshall) Civil Docket for Case #: 2:04-CV-00359-TJW last entry date: May 8, 2006 total 30 pages.
Case No. 2:04-CV-32-TJW: *O2 Micro International Limited* v. (1) *Beyond Innovation Technology Co., Ltd.*; (2) SPI Electronic Co., Ltd.; (3) FSP Group and (4) Lien Chang Electronic Enterprise Co., Ltd. -- Complaint for Patent Infringement Document 1 filed Jan. 30, 2004 total 6 pages.
Case No. 2:04-CV-32-TJW: *O2 Micro International Limited* v. (1) *Beyond Innovation Technology Co., Ltd.*; (2) SPI Electronic Co., Ltd.; (3) FSP Group and (4) Lien Chang Electronic Enterprise Co., Ltd. *SPI Electronic Co. Ltd.* v. *O2 Micro International Limited* -- SPI's Answer to Complaint and Counterclaims Document 6 Filed May 26, 2004 total 7 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. *Beyond Innovation Technology Co., Ltd., and Lien Chang Electronic Enterprise Co., Ltd.* v. *O2 Micro Internal Limited* -- Answer and Counterclaim of Defendants Beyond Innovation Technology Co., Ltd. and Lien Chang Electronic Enterprise Co., Ltd. Document 12 Filed Jul. 8, 2004 total 12 pages.
Case No. 2:04-CV-32-TJW: *O2 Micro International Limited* v. *Beyond Innovation Technology Co., Ltd.*; SPI Electronic Co., Ltd.; FSP Group and Lien Chang Electronic Enterprise Co., Ltd. *Beyond Innovation Technology Co., Ltd., and Lien Chang Electronic Enterprise Co., Ltd.* v. *O2 Micro Internal Limited* First Amended Complaint for Patent Infringement Document 47 Filed Nov. 17, 2004 total 8 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- Answer to First Amended Complaint and Amended Counterclaims Document 49 Filed Dec. 2, 20004 total 14 pages.
Case No. 2:04-CV-32-TJW: *O2 Micro International Limited* v. *Beyond Innovation Technology Co., Ltd.*; SPI Electronic Co., Ltd.; FSP Group and Lien Chang Electronic Enterprise Co., Ltd. *Beyond Innovation Technology Co., Ltd., and Lien Chang Electronic Enterprise Co., Ltd.* v. *O2 Micro Internal Limited* -- Answer to First Amended Complaint and Counterclaim of Defendant Beyond Innovation Technology Co., Ltd. Document 50 Filed Dec. 2, 2004 total 21 pages.
Case No. 2:04-CV-32-TJW: *O2 Micro International Limited* v. *Beyond Innovation Technology Co., Ltd.*; SPI Electronic Co., Ltd.; FSP Group and Lien Chang Electronic Enterprise Co., Ltd. *Beyond Innovation Technology Co., Ltd., and Lien Chang Electronic Enterprise Co., Ltd.* v. *O2 Micro Internal Limited* -- Lien Chang's Answer to First Amended Complaint and Counterclaims Document 51 Filed Dec. 3, 2004 total 9 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. *Beyond Innovation Technology Co., Ltd., and Lien Chang Electronic Enterprise Co., Ltd.* v. *O2 Micro Internal Limited* -- O2 Micro International Limited's Opening Claim Construction Brief Document 102-1 Filed Apr. 25, 2005 total 21 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- SPI Electronic's Response Brief in Support of its Proposed Claim Construction Document 105 filed May 9, 2005 total 17 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- Defendant Beyond Innovation Technology Co., Ltd's Responsive Brief on Claim Construction Document 108-1 Filed May 10, 2005 total 17 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. *Beyond Innovation Technology Co., Ltd., SPI Electronic Co., Ltd. and Lien Chang Electronic Enterprise Co., Ltd.* v. *O2 Micro Internal Limited* -- O2 Micro International Limited's Reply Claim Construction Brief Document 116 Filed Jun. 6, 2005 total 9 pages.

Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- FSP Group's Answer to First Amended Complaint and Counterclaims Document 118 Filed Jul. 15, 2005 total 14 pages.
Case No. 2:04-CV-32-TJW: *O2 Micro International Limited* v.*Beyond Innovation Technology Co., Ltd. et al.* -- Order Document 129 Filed Aug. 26, 2005 total 2 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- Defendant Beyond Innovation Technology Co. Ltd.'s Motion for Summary Judgement of Invalidity Document 169 Filed Nov. 2, 2005 total p. 24.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- Defendant Beyond Innovation Technology Co. Ltd.s Motion for Summary Judgement of Unenforceability due to Inequitable Conduct Document 171 Filed Nov. 2, 2005 total 16 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- Defendant Beyond Innovation Technology Co. Ltd.'s Reply to O2 Micro International Ltd.'s Oppositeion to Bitek's Motion for Summary Judgment of Unenforceablity Due to Inequitable Conduct Document 220 Filed Nov. 23, 2005 total 7 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- Defendant Beyond Innovation technology Co. Ltd.'s Reply to O2 Micro International Ltd.'s Oppositeion to Bitek's Motion for Summary Judgment of Invalidity Document 221 Filed Nov. 23, 2005 Total 7 pages.
Case No. 2:04-CV-32-TJW: *O2 Micro International Limited* v.*Beyond Innovation Technology Co., Ltd.; SPI Electronic Co., Ltd.; FSP Group and Lien Chang Electronic Enterprise Co., Ltd.* -- Second Amended Joint final Pretrial Order Document 352 Filed May 9, 2006 total 54 pages.
Case No. 2:04-CV-32-TJW: *O2 Micro International Limited* v.*Beyond Innovation Technology Co., Ltd et al.* -- Defendant Beyond Innovation Technology Co., Ltd.'s Supplemental Brief Regarding Inequitable Conduct Document 411 Filed Dec. 12, 2006 total 21 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- Defendant Beyond Innovation Technology Co. Ltd.'s Final Invalidity Contentions Filed Oct. 17, 2005 total 259 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- Expert Report of Dr. Praveen Jain Document 216 Filed Nov. 22, 2005 total 96 pages.
Case No. 2:04-CV-32-TJW: *O2 Micro International Limited* v.*Beyond Innovation Technology Co., Ltd.*; SPI Electronic Co., Ltd.; FSP Group and Lien Chang Electronic Enterprise Co., Ltd. -- US District Court Eastern District of Texas (Marshall) Docket Sheet Case #: 2:04-CV-0032-TJW last entry date: Jul. 26, 2007 total 46 pages.
Case No. 2:04-cv-323-TJW: *O2 Micro International Limited* v.*Samsung Electronics Co., Ltd.* -- Complaint for Patent Infringement Document 1-1 Filed Sep. 3, 2004 pp. 1-6.
Case No. 2:04-cv-323-TJW: *O2 Micro International Limited* v. (1) Samsung Electronics Co., Ltd., (2) Samsung Electronics America, Inc., (3) Samsung SDI Co., Ltd., and (4) Samsung SDI America, Inc. -- First Amended Complaint for Patent Infringement Document 2-1 Filed Oct. 15, 2004 total 7 pages.
Case No. 2:04-cv-323-TJW: *O2 Micro International Limited* v.*Samsung Electronics Co., Ltd., Samsung Electronics America, Inc., Samsung SDI Co., Ltd., and Samsung SDI America, Inc.* -- Defendants Samsung Electronics Co., Ltd. and Samsung Electronics America, Inc.'s Answer to Plaintiff's First Amended Complaint and Counterclaims Document 12 Filed Mar. 8, 2005 Total 11 pages.
Case No. 2:04-cv-323-TJW: *O2 Micro International Limited* v.*Samsung Electronics Co., Ltd., Samsung Electronics America, Inc.*,

*Samsung SDI Co., Ltd., and Samsung SDI America, Inc.* -- Defendants Samsung SDI Co., Ltd. and Samsung SDI America, Inc's Answer to Plaintiff's First Amended Complaint, and Counterclaims Document 16 Filed Mar. 22, 2005 total 11 pages.

Case No. 2:04-cv-323-TJW: *O2 Micro International Limited v.Samsung Electronics Co., Ltd., Samsung Electronics America, Inc., Samsung SDI Co., Ltd., and Samsung SDI America, Inc.* -- Plaintiff O2 Micro International Limited's Opening Claim Construction Brief Document 57-1 Filed Feb. 17, 2006 Total 50 pages.

Case No. 2:04-cv-323-TJW: *O2 Micro International Limited v.Samsung Electronics Co., Ltd., and Samsung Electronics America, Inc.* -- Responsive Brief on Claim Construction Document 60-1 Filed Mar. 3, 2006 total 44 pages.

Case No. 2:04-cv-323-TJW: *O2 Micro International Limited v.Samsung Electronics Co., Ltd., Samsung Electronics America, Inc., Samsung SDI Co., Ltd., and Samsung SDI America, Inc.* -- Plaintiff O2 Micro International Limited's Reply Brief on Claim Construction Document 63 Filed Mar. 17, 2006 total 26 pages.

Case No. 2:04-cv-323-TJW: *O2 Micro International Limited v.Samsung Electronics Co., Ltd., Samsung Electronics America, Inc., Samsung SDI Co., Ltd., and Samsung SDI America, Inc.* -- Defendants Samsung Electronics Co., Ltd. and Samsung Electronics America, Inc.'s First Amended Answer Document 66 Filed Mar. 20, 2006 total 18 pages.

Case No. 2:04-cv-323-TJW: *O2 Micro International Limited v.Samsung Electronics Co., Ltd.,et al* -- Memorandum Opinion and Order Document 84 Filed Jun. 28, 2006 total 16 pages.

Case No. 2:04-cv-323-TJW: *O2 Micro International Limited v.Samsung Electronics Co., Ltd., Samsung Electronics America, Inc.,* -- Defendants Samsung Electronics Co., Ltd. and Samsung Electronics America, Inc.'s Second Amended Answer Document 108 Filed Dec. 7, 2006 total 19 pages.

Case No. 2:04-cv-323-TJW: *O2 Micro International Limited v.Samsung Electronics Co., Ltd., Samsung Electronics America, Inc.* -- Defendants' Motion for Summary Judgment on Invalidity of Asserted Claims of U.S. Patent No. 6,707,264 Document 131 Filed Feb. 21, 2007 total 8 pages.

Case No. 2:04-cv-323-TJW: *O2 Micro International Limited v.Samsung Electronics Co., Ltd., Samsung Electronics America, Inc.* -- Defendants' Reply in Support of Their Motion for Summary Judgment of Invalidity of U.S. Patent No. 6,707,264 Document 169 Filed Mar. 16, 2007 total 3 pages.

Case No. 2:04-cv-323-TJW: *O2 Micro International Limited v.Samsung Electronics Co., Ltd., Samsung Electronics America, Inc.* -- Joint Final Pretrial Order Document 207 Filed Apr. 2, 2007 total 67 pages.

Case No. 2:04-cv-359-TJW: *O2 Micro International Limited v.Samsung Electronics Co., Ltd., Samsung Electronics America, Inc. Samsung SDI Co., Ltd.* -- Defendants Samsung Electronics Co., Ltd. and Samsung Electronics America, Inc.'s Notice Under 35 U.S.C. § 282 Document 141 Filed Mar. 2, 2007 total 9 pages.

Case No. 2:05-cv-323-TJW: *O2 Micro International Limited v. (1) Hon Hai Precision Industry Co., Ltd. a/k/a Foxconn, and (2) Ambit Microsystems Corporation* -- First Amended Answer and Counterclaims by Hon Hai Precision Industry Co., Ltd. a/s/a Foxconn Document 30 Filed Feb. 3, 2006 total 19 pages.

Case No. 2:05-CV-323-TJW: *O2 Micro International Limited v. (1) Hon Hai Precision Industry Co., Ltd. a/k/a Foxconn, and (2) Ambit Microsystems Corporation* -- Complaint for Patent Infringement Document 1-1 Filed Jul. 18, 2005 total 6 pages.

Case No. 2:05-CV-323-TJW: *O2 Micro International Limited v. (1) Hon Hai Precision Industry Co., Ltd. a/k/a Foxconn, and (2) Ambit Microsystems Corporation* Answer and Demand for Jury by Hon Hai Precision Industry Co., Ltd. a/k/a Foxconn Document 13 filed Sep. 23, 2005 total 8 pages.

Case No. 2:05-CV-323-TJW: *O2 Micro International Limited v. (1) Hon Hai Precision Industry Co., Ltd. a/k/a Foxconn, and (2) Ambit Microsystems Corporation* -- First Amended Answer and Counterclaims by Hon Hai Precision Industry Co., Ltd. a/s/a Foxconn Document 30 Filed Feb. 3, 2006 total 19 pages.

Case No. 2:05-CV-323-TJW: *O2 Micro International Limited v. (1) Hon Hai Precision Industry Co., Ltd. a/k/a Foxconn, and (2) Ambit Microsystems Corporation* -- Joint Claim Construction and Prehearing Statement and Exhibit A Document 82 Filed Oct. 26, 2006 total 44 pages.

Case No. 2:05-CV-323-TJW: *O2 Micro International Limited v. (1) Hon Hai Precision Industry Co., Ltd. a/k/a Foxconn, and (2) Ambit Microsystems Corporation* -- Plaintiff O2 Micro International Limited's Opening Claim Construction Brief Document 83 Filed Nov. 16, 2006 total 8 pages.

Case No. 2:05-CV-323-TJW: *O2 Micro International Limited v. Hon Hai Precision Industry Co., Ltd. a/k/a Foxconn, and Ambit Microsystems Corporation* -- Honhai's Claim Construction Brief Document 88 Filed Dec. 7, 2006 total 39 pages.

Case No. 2:05-CV3-323-TJW: *O2 Micro International Limited v. (1) Hon Hai Precision Industry Co., Ltd. a/k/a Foxconn, and (2) Ambit Microsystems Corporation* -- Plaintiff O2 Micro International Limited's Reply Claim Construction Brief Document 90 Filed Dec. 18, 2006 total 28 pages.

Case No. 2:05-CV-323-TJW-CE: *O2 Micro International Limited v. Hon Hai Precision Industry Co., Ltd. a/k/a Foxconn, and Ambit Microsystems Corporation* -- Plaintiff O2 Micro International Limited's Response in Opposition to Second Supplement to Hon Hai's Claim Construction Brief Regarding the Reexamination of O2 Micro's '615 and '722 Patents Document 125 Filed Apr. 9, 2007 total 12 pages.

Case No. 2:05-CV-323-TJW-CE: *O2 Micro International Limited v. Hon Hai Precision Industry Co., Ltd. a/k/a Foxconn, and Ambit Microsystems Corporation* -- Reply in Support of Hon Hai's Second Supplement to its Claim Construction Brief Document 127 Filed Apr. 16, 2007 total 9 pages.

Case No. 2:05-CV-323-TJW-CE: *O2 Micro International Limited v. Hon Hai Precision Industry Co., Ltd. a/k/a Foxconn, and Ambit Microsystems Corporation* -- Defendant Hon Hai Precision Industry Co., Ltd's Motion for Summary Judgment Document 134 Filed May 14, 2007 total 52 pages.

Case No. 2:05-CV-323-TJW-CE: *O2 Micro International Limited v. Hon Hai Precision Industry Co., Ltd. a/k/a Foxconn, and Ambit Microsystems Corporation* -- Defendant Hon Hai Precison Industry Co., Ltd's Preliminary Invalidity Contentions Filed Mar. 28, 2006 total 33 pages.

Case No. 2:05-CV-323-TJW-CE: *O2 Micro International Limited v. Hon Hai Precision Industry Co., Ltd. a/k/a Foxconn, and Ambit Microsystems Corporation* -- Hon Hai Precision Industry Co., Ltd.'s Updated Preliminary Invalidity Contentions Sep. 15, 2006 total 40 pages.

Case No. 2:05-CV-323-TJW-CE: *O2 Micro International Limited v. Hon Hai Precision Industry Co., Ltd. a/k/a Foxconn, and Ambit Microsystems Corporation* -- U.S. District Court Eastern District of Texas (Marshall) Docket Sheet for Case #: 2:05-CV-323 last entry date Aug. 20, 2007 total 26 pages.

Case No. 4:06-CV-02929-CW: *O2 Micro International Limited v. Monolithic Power Systems, Inc.* -- Advanced Semiconductor Manufacturing Corporation's Answer and Counterclaims to O2's Second Amended Complaint Document 4-1 Filed May 19, 2006 total 17 pages.

Case No. 4:06-CV-02929-CW: *O2 Micro International Limited v. Monolithic Power Systems, Inc.* -- Asustek Computer, Inc.'s Answer and Counterclaims to O2's Second Amended Complaint Document 6-1 Filed May 19, 2006 total 19 pages.

Case No. 4:06-CV-02929-CW: *O2 Micro International Limited v. Monolithic Power Systems, Inc.*, Asustek Computer, Inc., Michael Hisng, Compal Electronics Inc., Compal Information (Kunshan) Co., Ltd., Compal Electronics Technology (Kunshan) Co., Ltd., Asustek Computer (Suzhou) Co., Ltd., Advanced Semiconductor Manufacturing Corporation Limited a/k/a Advanced Semiconductor Manufacturing Corporation of Shanghai -- [Proposed] Third Amended Complaint for Patent Infringement and Unfair Competition; Demand for Jury Trial Document 39 Filed Jul. 26, 2006 total 10 pages.

Case No. 4:06-CV-02929-CW: *O2 Micro International Limited v. Monolithic Power Systems, Inc. et al.* -- Compal Electronics, Inc.'s [Proposed] Answer to Plaintiff O2 Micro International Limited's Third Amended Complaint Document 41 Filed Jul. 28, 2006 total 22 pages.

Case No. 4:06-CV-02929-CW: *O2 Micro International Limited* v. *Monolithic Power Systems, Inc. et al.* Asustek Computer, Inc.'s Answer and Counterclaims to O2's Micro's Third Amended Complaint Document 42 Filed Jul. 28, 2006 total 19 pages.

Case No. 4:06-CV-02929-CW: *O2 Micro International Limited* v. *Monolithic Power Systems, Inc. et al.* -- Michael R. Hisng's Answer to O2 Micro's Thrid Amended Complaint Document 43 Filed Jul. 28, 2006 total 10 pages.

Case No. 4:06-CV-02929-CW: *O2 Micro International Limited* v. *Monolithic Power Systems, Inc. et al.* -- Monolithic Power Systems, Inc.'s Answer and Counterclaims to O2 Micro's Third Amended Complaint Document 44 Filed Jul. 28, 2006 total 29 pages.

Case No. 4:06-CV-02929-CW: *O2 Micro International Limited* v. *Monolithic Power Systems, Inc. et al.* -- Advanced Semiconductor Manufacturing Corporation's Answer and Counterclaims to O2's Third Amended Complaint Document 45 Filed Jul. 28, 2006 total 18 pages.

Case No. 4:06-CV-02929-CW: *O2 Micro International Limited* v. *Monolithic Power Systems, Inc. et al.* -- Michael Hisng's Supplemental Invalidity Contentions and Monolithic Power Systems, Inc.'s, Asustek Computer Inc.'s and Advanced Semiconductor Manufacturing Corporation Ltd.'s, Second Supplemental Invalidity Contentions and Exhibits Filed Jul. 28, 2006 total 797 pages.

Case No. 4:06-CV-02929-CW: *O2 Micro International Limited* v. *Monolithic Power Systems, Inc. et al.* -- Michael Hisng's, Supplemental Invalidity Contentions and Monolithic Power Systems, Inc.'s, Asustek Computer Inc.'s and Advanced Semiconductor Manufacturing Corporation Ltd.'s Second Supplemental Invalidity Contentions Aug. 7, 2006 total 33 pages.

Case No. 4:06-CV-02929-CW: *O2 Micro International Limited* v. *Monolithic Power Systems, Inc. et al.* -- Michael Hisng's Monolithic Power Systems, Inc.'s, Asustek Computer Inc.'s and Advanced Semiconductor Manufacturing Corporation Ltd.'s, Final Invalidity Contentions Aug. 24, 2006 total 30 pages.

Case No. 4:06-CV-02929-CW: *O2 Micro International Limited* v.*Monolithic Power Systems, Inc. et al.* -- U.S. District Court California Northern District (Oakland) Civil Docket For Case #: 4:06-CV-02929-CW last entry date: Sep. 14, 2006 total 9 pages.

Case No. 2:03-CV-00007-TJW: *O2 Micro International Limited* v. (1) *Sumida Corporation* and (2) *Taiwan Sumida Electronics Inc.* -- Complaint for Patent Infringement Document 1 Filed Jan. 6, 2003 total 47 pages.

Case No. 2:03-CV-00007-TJW: *O2 Micro International Limited* v. *Sumida Corporation and Taiwan Sumida Electronics Inc.* -- Sumida Corporation and Taiwan Sumida Electronics, Inc. Answer to O2 Micro's Complaint Document 55 Filed Apr. 5, 2004 total 6 pages.

Case No. 2:03-CV-00007-TJW: *O2 Micro International Limited* v. *Taiwan Sumida Electronics Inc.* -- O2 Micro International Limited's Opening Claim Construction Brief Document 90 Filed Dec. 1, 2004 total 33 pages.

Case No. 2:03-CV-00007-TJW: *O2 Micro International Limited* v. *Taiwan Sumida Electronics Inc.* -- Joint Claim Construction and Prehearing Statement and Exhibit A Document 89-1 and 89-2 Filed Oct. 22, 2004 total 60 pages.

Case No. 2:03-CV-00007-TJW: *O2 Micro International Limited* v. (1) *Sumida Corporation* and (2) *Taiwan Sumida Electronics Inc.* -- O2 Micro International Limited's Reply Claim Construction Brief Document 96 Filed Dec. 22, 2004 total 37 pages.

Case No. 2:03-CV-00007-TJW: *O2 Micro International Limited* v. *Sumida Corporation et al.* -- Memorandum Opinion and Order Document 102 Filed Mar. 8, 2005 total 15 pages.

Case No. 2:03-CV-00007-TJW: *O2 Micro International Limited* v. *Taiwan Sumida Electronics Inc.* -- Motion for Summary Judgment Number 3 (Invalidity of Claim 39 and 40) Document 125-1 Filed Apr. 27, 2005 total 7 pages.

Case No. 2:03-CV-00007-TJW: *O2 Micro International Limited* v. *Taiwan Sumida Electronics Inc.* -- Joint Final Pretrial Order Document 178-1 Filed Aug. 23, 2005 total 30 pages.

Case No. 2:03-CV-00007-TJW: *O2 Micro International Limited* v. *Taiwan Sumida Electronics Inc.* -- TSE's Amended Renewed Motion for Judgment as a Matter of Law Document 250 Filed Jan. 9, 2006 total 27 pages.

Case No. 2:03-CV-00007-TJW: *O2 Micro International Limited* v. *Taiwan Sumida Electronics Inc.* -- TSE's Reply in Support of Amended Renewed Motion for Judgment as a Matter of Law Document 276 Filed Mar. 6, 2006 total 20 pages.

Case No. 2:03-CV-00007-TJW: *O2 Micro International Limited* v. *Taiwan Sumida Electronics Inc.* -- Defendant Taiwan Sumida Electronics, Inc.'s Final Invalidity Contentions and Exhibits Filed May 2, 2005 total 166 pages.

Case No. 2:03-CV-00007-TJW: *O2 Micro International Limited* v. *Taiwan Sumida Electronics Inc.* -- Expert Report of Clyde M. Brown Jr., P.E. Mar. 25, 2005 total 65 pages.

Case No. 2:03-CV-00007-TJW: *O2 Micro International Limited* v. *Taiwan Sumida Electronics Inc.* --U.S. District Court Estern District of Texas (Marshall) Civil Docket for Case #: 2:03-CV-00007-TJW last entry date Jul. 26, 2007 total 16 pages.

Case No. 2:03-CV-00007-TJW: *O2 Micro International Limited* v. *Taiwan Sumida Electronics Inc.* -- Defendant Taiwan Sumida Electronics, Inc.'s Final Invalidity Contentions May 2, 2005 total 6 pages.

Case No. 2:03-CV-00007-TJW: *O2 Micro International Limited* v. *Taiwan Sumida Electronics Inc.* -- Defendent Taiwan Sumida Electronics, Inc.'s Notice Under 35 U.S.C. § May 3, 2005 total 6 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc.* -- Complaint for Patent Infringement Document 1-1 Filed Jun. 3, 2005 total 7 pages.

Case No. 2:05-CV-00211-TJW: *O2 Micro International Limited* v. *Rohm Co., Ltd., Sony Corporation, Sony EMCS Corporation, Sony Corporation of America and Sony Electronics Inc.* -- Defendant Rohm Co. Ltd.'s Answer and Counterclaims to Plaintiff's Complaint Document 38 Filed Feb. 15, 2006 total 10 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc.* --Sony Corporation, Sony EMCS Corporation, Sony Corporation of America and Sony Electronics Inc.'s Answer to O2 Micro's Complaint Document 41 Filed Feb. 16, 2006 total 29 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc.* -- First Amended Complaint for Patent Infringement Document 84 Filed Dec. 11, 2006 total 9 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc.* -- Rohm Co. Ltd's Answer to O2 Micro's First Amended Complaint for Patent Infringement, First Amended Defenses, and First Amended Counterclaims Document 89 Filed Jan. 5, 2007 total 71 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc.* -- Sony Corporation, Sony EMCS Corporation, Sony Corporation of America and Sony Electronics Inc.'s Answer to O2 Micro's First Amended Complaint with Counterclaims Document 90 Filed Jan. 5, 2007 total 63 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc.* -- Sony Corporation, Sony EMCS Corporation, Sony Corporation of America and Sony Electronics Inc.'s Answer to O2 Micro's First Amended Complaint and First Amended Counterclaims Document 100 Filed Jan. 30, 2007 total 62 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc.* -- Rohm Co. Ltd's Amended Answer to O2 Micro's First Amended Complaint for Patent Infringement, First Amended Defenses, and Second Amended Counterclaims Document 102 Filed Feb. 1, 2007 total 71 pages.

Case No. 2:05-CV-00211-TJW: *O2 Micro International Limited* v. *Rohm Co., Ltd., Sony Corporation, Sony EMCS Corporation, Sony Corporation of America and Sony Electronics Inc. Sony Corporation and Sony Electronics Inc.* v. *Microsemi Corporation* -- Third-Party Defendant Microsemi Corporation's Answer to Sony Corporation and Sony Electronics Inc.'s Third-Party Complaint; and Microsemi Corporation's Claims Against Plaintiff O2 Micro International Ltd. Document 128 Filed Apr. 13, 2007 total 39 pages.

Case No. 2:05-CV-00211-TJW: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation* -- Microsemi Corporation's Reply to Counterclaims of O2 Micro International Limited and Demand for Jury Trial Document 139 Filed Jun. 1, 2007 total 14 pages.

Case No. 2:05-CV-00211-TJW: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation* -- Third-Party Defendant Microsemi Corporation's Answer to Sony Corporation and Sony Electronics Inc.'s Third-Party Complaint; and Microsemi Corporation's Amended Claims Against Plaintiff O2 Micro International Ltd. Document 160 Filed Jul. 9, 2007 total 51 pages.

Case No. 2:05-CV-00211-TJW-CE: (1) *O2 Micro International Limited* v. (1) *Rohm Co., Ltd.*, (2) *Sony Corporation, Sony EMCS Corporation, Sony Corporation of America* and *Sony Electronics Inc.* (1) *Sony Corporation* and (2) *Sony Electronics Inc.* v. (1) *Microsemi Corporation* -- Joint Claim Construction and Prehearing Statement Pursuant to Patent Rule 4-3 and Exhibit A-D Document 167 Filed Jul. 18, 2007 total 61 pages.

Case No. 2:05-CV-00211-TJW-CE: *O2 Micro International Limited* v. (1) *Rohm Co., Ltd.*, (2) *Sony Corporation*, (3) *Sony EMCS Corporation*, (4) *Sony Corporation of America* and (5) *Sony Electronics Inc. Sony Corporation and Sony Electronics Inc. v. Microsemi Corporation* -- Plaintiff O2 Micro International Limited's Opening Claim Construction Brief Document 172 Filed Jul. 23, 2007 total 18 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation* -- Rohm's Responsive Brief on Claim Construction Document 198 Filed Aug. 8, 2007 total 43 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation* -- Microsemi Corporation's Responsive Brief on Claim Construction Document 199 Filed Aug. 8, 2007 total 53 pages.

Case No. 2:05-CV-00211-TJW-CE: *O2 Micro International Limited* v. (1) *Rohm Co., Ltd.*, (2) *Sony Corporation*, (3) *Sony EMCS Corporation*, (4) *Sony Corporation of America* and (5) *Sony Electronics Inc. v. Microsemi Corporation* -- Plaintiff O2 Micro International Limited's Reply Claim Construction Brief Document 209 Filed Aug. 13, 2007 total 30 pages.

Case No. 2:05-CV-00211-TJW-CE: *O2 Micro International Limited* v. (1) *Rohm Co., Ltd., Sony Corporation, Sony EMCS Corporation, Sony Corporation of America and Sony Electronics Inc. Sony Corporation and Sony Electronics Inc. v. Microsemi Corporation* -- Notice of Filing Joint Claim Construction Chart and Exhibit A-C Document 223 total 122 pages.

Case No. 2:05-CV-00211-TJW-CE: *O2 Micro International Limited* v. (1) *Rohm Co., Ltd., Sony Corporation, Sony EMCS Corporation, Sony Corporation of America and Sony Electronics Inc. Sony Corporation and Sony Electronics Inc. v. Microsemi Corporation* -- Rohm Co., Ltd.'s Invalidity Contentions total 18 pages.

Case No. 2:05-CV-00211-TJW-CE: *O2 Micro International Limited* v. (1) *Rohm Co., Ltd., Sony Corporation, Sony EMCS Corporation, Sony Corporation of America and Sony Electronics Inc. Sony Corporation and Sony Electronics Inc. v. Microsemi Corporation* -- U.S. District Court [Live] Eastern District of Texas Live (Marshall) Civil Docket for Case #: 2:05-CV-00211-TJW last entry date Aug. 24, 2007 total 29 pages.

Case No. 2:05-CV-00211-TJW-CE: *O2 Micro International Limited* v. (1) *Rohm Co., Ltd., Sony Corporation, Sony EMCS Corporation, Sony Corporation of America and Sony Electronics Inc. Sony Corporation and Sony Electronics Inc. v. Microsemi Corporation* -- Microsemi Corporations's Preliminary Invalidity Contentions Regarding U.S. Patent Nos. 6,804,129, 6,259,615 and 6,396,722 total 28 pages.

Case No. C04 02000: *Monolithic Power Systems, Inc. v. O2 Micro International Ltd.* -- Defendants' Renewed Monions for Judgment as a Matter of Law and Conditional Motions for New Trial Document 1088 Filed Jul. 27, 2007 total 32 pages.

Case No. C04 02000: *Monolithic Power Systems, Inc. v. O2 Micro International Ltd.* -- O2 Micro International Limited's Response to Counter-Defendants Advanced Semiconductor Manufacturing Corporation Limited's First Set of Requests for Admission Filed Jun. 28, 2006 total 14 pages.

Case No. C04 02000: *Monolithic Power Systems, Inc. v. O2 Micro International Ltd.* -- O2 Micro International Limited's Response to Monolithic Ower Systems, Inc.'s First Set of Requests for Admission Filed Jun. 28, 2006 total 45 pages.

Case No. C04 02000CW (C06-02929CW): *Monolithic Power Systems, Inc. v. O2 Micro International Ltd.*, and *O2 Micro International Ltd. v. Monolithic Power Systems, Inc. et al.* -- O2 Micro International Ltd's Responses and Objections to Monolithic Ower Systems, Inc., Advanced Semiconductor Manufacturing Corporation of Shanghai, Asustek Computer, Inc., and Michael Hisng's First set of Request for Admissions (Nos. 1-11) Filed Aug. 18, 2006 total 8 pages.

Case No. C04 02000CW (C06-02929CW): *Monolithic Power Systems, Inc. v. O2 Micro International Ltd.*, and *O2 Micro International Ltd. v. Monolithic Power Systems, Inc. et al.* -- O2 Micro International Ltd.'s Responses to Counter-Defendant Advanced Semiconductor Manufacturing Corporation Limited's First Set of Requests for Admission Filed Aug. 28, 2006 total 19 pages.

Case No. C04 02000CW (C06-02929CW): *Monolithic Power Systems, Inc. v. O2 Micro International Ltd.*, and *O2 Micro International Ltd. v. Monolithic Power Systems, Inc. et al.* -- O2 Micro International Ltd.'s Responses and Objections to Monolithic Ower Systems, Inc.'s First Set of Requests for Admission (Nos. 1-154) Filed Aug. 28, 2006 total 53 pages.

Case No. C04 02000CW (C06-02929CW): *Monolithic Power Systems, Inc. v. O2 Micro International Ltd.*, -- MPS's and Asustek's Opening Brief on Inequitable Conduct Document 1096 Filed Aug. 10, 2007 total 30 pages.

Case No. C04 02000CW (C06-02929CW): *Monolithic Power Systems, Inc. v. O2 Micro International Ltd.*, -- Defendants' Reply in Support of their Motions for Judgment as a Matter of Law or New Trial and Oppositeion to O2 Micro's Motions for Judgement as a Matter of Law or a New Trial Document 1108 Filed Aug. 17, 2007 total 68 pages.

Case No. C04 02000CW (C06-02929CW): *Monolithic Power Systems, Inc. v. O2 Micro International Ltd.*, -- MPS and Asustek's Reply in Support of Their Inequitable Conduct Defense Document 1116 Filed Aug. 24, 2007 total 18 pages.

Case No. 2:04-CV-32-TJW: *O2 Micro International Limited* v. (1) *Beyond Innovation Technology Co., Ltd.*; (2) *SPI Electronic Co., Ltd.*; (3) *FSP Group* and (4) *Lien Chang Electronic Enterprise Co., Ltd.* -- Joint Claim Construction and Prehearing Statement Document 94-1 to 94-6 Filed Mar. 21, 2005 total 42 pages.

Case No. 2:04-CV-32-TJW: *O2 Micro International Limited* v. (1) *Beyond Innovation Technology Co., Ltd.*; (2) *SPI Electronic Co., Ltd.*; (3) *FSP Group* and (4) *Lien Chang Electronic Enterprise Co., Ltd.* O2 Micro's Responses and Objections to Bitek's First Set of Requests for Admission (Nos. 1-8) and Second Set of Interrogatories (No. 19) Filed Nov. 9, 2004 total 11 Pages.

Case No. 2:04-CV-32-TJW: *O2 Micro International Limited* v. (1) *Beyond Innovation Technology Co., Ltd.*; (2) *SPI Electronic Co., Ltd.*; (3) *FSP Group* and (4) *Lien Chang Electronic Enterprise Co., Ltd.* -- Transcript of Trial Date: May 15, 2006 total 51 pages.

Case No. 2:04-CV-32-TJW: *O2 Micro International Limited* v. (1) *Beyond Innovation Technology Co., Ltd.* -- Videotaped Deposition of Yung-Lin Lin Date Oct. 6, 2005 total 88 pages.

Case No. 2007-1302, 1303, 1304 United States Court Appeals for the Federal Circuit *O2 Micro International Limited v. Beyond Innovation Technology Co., Ltd.*; and *FSP Group* and *SPI Electronic Co., Ltd.*; and *Lien Chang Electronic Enterprise Co. Ltd*, Appeals for the United States District Court for the Easterb District of Texas in 2:04-CV-32 Hon. T. John Ward -- Brief of Defendant - Appellant Beyond Innovation Technology Co., Ltd. Filed Jul. 16, 2007 total 101 pages.
Case No. 2007-1302, 1303, 1304 United States Court Appeals for the Federal Circuit *O2 Micro International Limited* v. *Beyond Innovation Technology Co., Ltd.*; and *FSP Group* and *SPI Electronic Co., Ltd.*; and *Lien Chang Electronic Enterprise Co. Ltd*, Appeals for the United States District Court for the Eastern District of Texas in 2:04-CV-32 Hon. T. John Ward -- Opening Brief of Appellants FSP Grouop and SPI Electronic Co., Ltd (Now Named FSP Technology Inc.) Filed Jul. 16, 2007 total 75 pages.
Case No. 2007-1302, 1303, 1304 United States Court of Appeals for the Federal Circuit *O2 Micro International Limited* v. *Beyond Innovation Technology Co., Ltd.*; and *FSP Group* and *SPI Electronic Co., Ltd.*; and *Lien Chang Electronic Enterprise Co. Ltd*, Appeals for the United States District Court for the Eastern District of Texas in 2:04-CV-32 Hon. T. John Ward -- Principal Brief of Defendant-Appellant Lien Chang Electronic Enterprise Co., Ltd. Filed Jul. 16, 2007 total 66 pages.
Case No. 2:04-cv-323-TJW: *O2 Micro International Limited* v. *Samsung Electronics Co., Ltd.* -- Joint Claim Construction and Pre-Heating Statement in Complaince with PLR-4-3 Document 56-1 Filed Jan. 9, 2006 total 39 pages.
Case No. 2:04-cv-323-TJW: *O2 Micro International Limited* v. *Samsung Electronics Co., Ltd.* and *Samsung Electronics America, Inc.* --Defendants Samsung Electronics Co. Ltd. and Samsung Electronics America, Inc.'s Supplemental Preliminary Invalidity Contentions Filed Sep. 1, 2006 total 315 pages.
Case No. 2:04-cv-323-TJW: *O2 Micro International Limited* v. *Samsung Electronics Co., Ltd.* and Samsung Electronics America, Inc.-- Deposition of Yung-Lin Lin Volume II Date: Jan. 30, 2007 total 120 pages.
Case No. 4:06-CV-02929-CW (C04-2000CW): *O2 Micro International Limited* v. *Monolithic Power Systems, Inc.* and *Monolithic Power Systems, Inc.* v. *O2 Micro International Limited*: Jury Trial Transcripts of Proceedings Date: May 14, 2007 vol. 9 pp. 1528-1696 total 144 Pages.
Case No. 4:06-CV-02929-CW (C04-2000CW): *O2 Micro International Limited* v. *Monolithic Power Systems, Inc., et al.*, -- Michael Hisng's Supplemental Invalidity Contentions and Monolithic Power Systems, Inc.'s and Advanced Semiconductor Manufacturing Corporation Ltd.'s Second Supplemental Invalidity Contentions filed Aug. 7, 2006 total 524 pages.
Case No. 4:06-CV-02929-CW (C04-2000CW): *O2 Micro International Limited* v. *Monolithic Power Systems, Inc. et al.*, -- Michael Hisng's, Monolithic Power Systems, Inc.'s Asustek Computer Inc.'s and Advanced Semiconductor Manufacturing Corporation Ltd.'s Final Invalidity Contentions, Certificate of Service and MPS, Asustek ASMC, and Compal's Disclosure Pursuant to 35 U.S.C. § 282 and Exhibits Filed Aug. 24, 2007 total 539 pages.
Case No. 2:05-CV-0323 (TJW): *O2 Micro International Limited* v. *Hon Hia Precision Industry Co., Ltd. a/k/a FoxConn and Ambit Microsystems Corporation* -- Hon Hai Precision Industry Co., Ltd.'s Updated Preliminary Invalidity Contentions and Exhibits Filed Sep. 15, 2006 total 853 pages.
Case No. 2:05-CV-0323 (TJW): *O2 Micro International Limited* v. *Hon Hai Precision Industry Co., Ltd. a/k/a Foxconn and Ambit Microsystems Corporation* -- O2 Micro International Ltd.'s Objections and Responses to Defendant's First Set of Request for Admissions Filed May 16, 2007 total 21 pages.
Case No. 2:05-CV-0323: *O2 Micro International Limited* v. *Hon Hai Precision Industry Co., Ltd. et al.* -- Order Filed Jul. 31, 2007 total 1 page.
Case No. 2:05-CV-0323 (TJW): *O2 Micro International Limited* v. *Hon Hai Precision Industry Co., Ltd. a/k/a Foxconn and Ambit Microsystems Corporation* -- Videotaped Deposition of Yung-Lin Lin Date: Mar. 23, 2007 total 108 pages.
Case No. 2:03-CV-00007-TJW: *O2 Micro International Limited* v. (1) *Sumida Corporation* and (2) *Taiwan Sumida Electronics Inc.* -- Defendant Taiwan Sumida Electronics, Inc.'s Preliminary Invalidity Contentions filed Sep. 2, 2004 total 230 pages.
Case No. 2:03-CV-00007-TJW: *O2 Micro International Limited* v. (1) *Sumida Corporation* and (2) *Taiwan Sumida Electronics Inc.* --

O2 Micro International Limited's Responses to Defendant Taiwan Sumida Electronics, Inc.'s First Set of Request for Admissions Filed May 16, 2007 total 21 pages.
Case No. 2:03-CV-00007-TJW: *O2 Micro International Limited* v. (1) *Sumida Corporation* and (2) *Taiwan Sumida Electronics Inc.* --Transcript of Trial Date Nov. 16, 2005 total 120 pages.
Case No. 2006-1411, -1436: United States Court of Appeals for the Federal Circuit *O2 Micro International Limited* vs. *Taiwan Sumida Electronics, Inc.* Appeals from the United States District Court for the Eastern District of Texas in Case No. 2:03-CV-00007, Judge T. John Ward. -- Appellant Taiwan Sumida Electronics, Inc.'s Reply Brief Filed Feb. 28, 2007 total 40 pages.
Case No. 2006-1411, -1436: United States Court of Appeals for the Federal Circuit *O2 Micro International Limited* vs. *Taiwan Sumida Electronics, Inc.* Appeals from the United States District Court for the Eastern District of Texas in Case No. 2:03-CV-00007, Judge T. John Ward. -- Brief for Defendant-Appellant Filed: Oct. 3, 2006 total 129 pages.
Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc.* --Rohm Co., Ltd.'s Invalidity Contentions Date Jul. 2, 2007 total 397 pages.
Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc. Sony Corportaion and Sony Electronics Inc.* v. *Microsemi Corporation* -- Microsemi Corporations' Preliminary Invalidity Contentions Regarding U.S. Pat. Nos. 6,804,129, 6,259,615 and 6,396,722 Filed Jul. 2, 2007 total 1278 pages.
Case No. C04 02000: *Monolithic Power Systems, Inc.* v. *O2 Micro International Ltd.*-- Trial Exhibit "Development of the Versatile Electronic Ballast for Metal Halide Lamps with Phase-Shift Soft-Switching Control" by C.L. Tsay et, al. p.p. MPS '129001108 to MPS '129 001115 total 8 pages.
Nalbant -- Phase Modulated PWM Topology with the ML4818, Micro Linear Application Note 42026 Date: Jun. 1996 total 16 pages.
Inventor: Nagai -- Projector Device Patent Abstracts of Japan Publication No.: 05-113604 Date of publication: May 7, 1993 total 20 pages.
Inventor: Koda, Takashima -- Lighting Device Patent Abstract of Japan Publication No.: 64-014895 Date of Publication: Jan. 19, 1989 total 15 pages.
Inventor: Koda, Takashima -- Lighting Apparatus European Patent Application Publication No.: 0298934A1 Date of publication: Nov. 1, 1989 total: 14 pages.
Inventor: Takehara Cold-Cathode Tube Lighting Apparatus Using Piezoelectric Transformer, Patent Abstract of Japan Publication No. 08-138876 Publication Date: May 31, 1996 total 25 pages.
Inventor: Ishikawa, Tanaka, Hirata -- Retrieving Device Patent Abstract of Japan Publication No. 04-085672 Date of Publication: Mar. 18, 1992 total 1 page.
Inventor Nishimura, Kouoka - Solid-Liquid Recovery Device Patent Abstract of Japan Publication No. 06-050297 Date of Publication Date: Feb. 22, 1994 total 16 pages.
T.H. Yu et al., -- Comparisons Among Self-Excited Parallel Resonant, Series Resonant and Current-Fed Push-Pull Electronic Ballasts, IEEE 1994 (MPS trial exhibit '129 000914-000920) total 7 pages.
Product Highlights -- DC/AC Inverter Improves Lighting Efficiency, Electronic Products Apr. 1996 total 1 page.
Raab -- Analysis of Idealized Class-D Power Amplifiers, Green Mountain Radio Research Company, 1982 total 21 pages.
Roddam -- Transistor Inverters and Converters, Iliffe Books Ltd., 1963 MPS trial exhibit MPS'72200191-197 total 7 pages.
LMX1597-01 Preliminary Data Sheet Linfinity Microelectronics May 1996 (MPS trial exhibit MPS '722 000205-209) total 5 pages.
Linfinity Brochure Referencing Lin Doc. #1596-98, 1997 (MPS trial exhibit MPS ' 722 000203-204) total 2 pages.
Lin -- Resonant Inverters and Their Applications to Electronic Ballasts and High Voltage Power Conversions University of Arizona 1996 total 246 pages.
Sumida *O2Micro International Limited, Plaintiff* v. *Taiwan Sumida Electronics, Inc.* Defendant Civil Action No. 2-03CV-007-TJW (Judge Ward) Defendant Taiwan Sumida Electronics, Inc. Final Invalidity Contentions 6 pages. Exhibits 1,2,4,7,8,10.

Bitek *O2Micro International Limited Plaintiff v. Beyond Innovation Technology Co., Ltd., SPI Electronics Co., Ltd., FSP Group, Lien Chang Electronics Enterprise Co., Ltd, Defendants*. And Related Counterclaims. Civil Action No. 2-04-CV-32(TJW) Assigned for All Purpose to the Honorable Judge T. John Ward Jury Trial Demanded-Defendant Beyond Innovation Technology Co., Ltd's Final Invalidity Contentions 5 pages Exhibits 8, 10, 12-14, 15a, 15b, 16, 18-23, 28, 30, 32, 34, 36, 38-40, 42, 43, 45-48.

Hon Hai *O2Micro International Limited, Plaintiff v. Hon Hai Precision Industry Co., Ltd a/k/a Foxconn and Ambit Microsystems Corporation Defendants*. Case No. 2-05CV-323 (TJW). Hon Ahi Precision Industry Co., Ltd.' Preliminary Invalidity Contentions 33 pages.

Hsing *O2 Micro International Limited, Plaintiff v. Monolithic Power Systems, Inc. Defendants*. Michael Hsing's Preliminary Invalidity Contentions and Monolithic Power Systems Inc.s and Asustek Computer Inc.s Supplementary Invalidity Contentions 27 pages.

MPSTX Case No. 2:04-CV-359 TJW Monolithic Power Systems, Inc. and Asuestek Computer Inc.s Preliminary Invalidity Contentions 23 pages 12 Exhibits 1-26.

Sumida *O2Micro International Limited, Plaintiff v. Taiwan Sumida Electronics, Inc*. Defendant Civil Action No. 2-03-03CV-007-TJW (Judge Ward) Defendant Taiwan Sumida Electronics, Inc. Final Invalidity Contentions 6 pages. Exhibits 1, 2, 4, 7, 8, 10.

\* cited by examiner

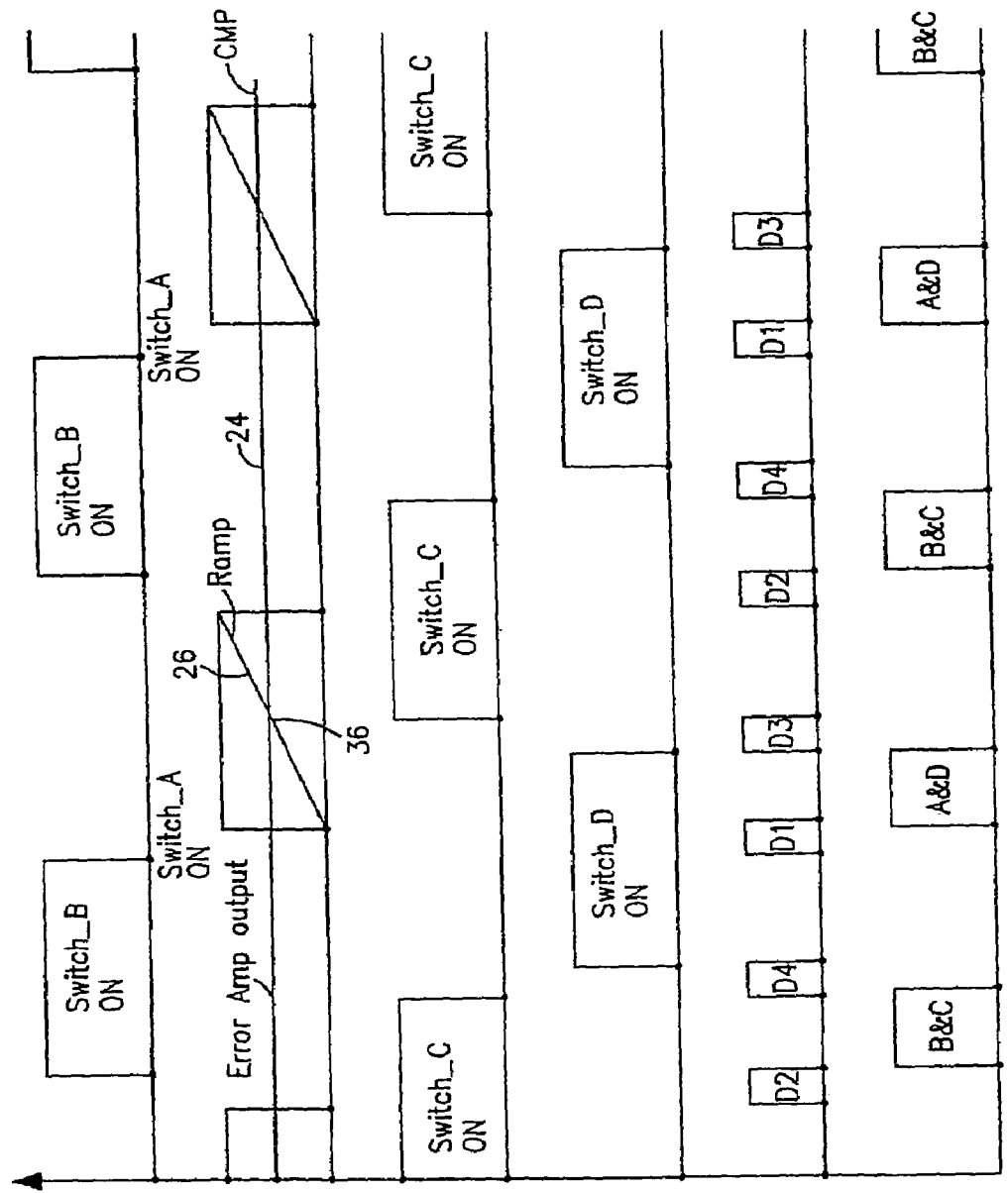

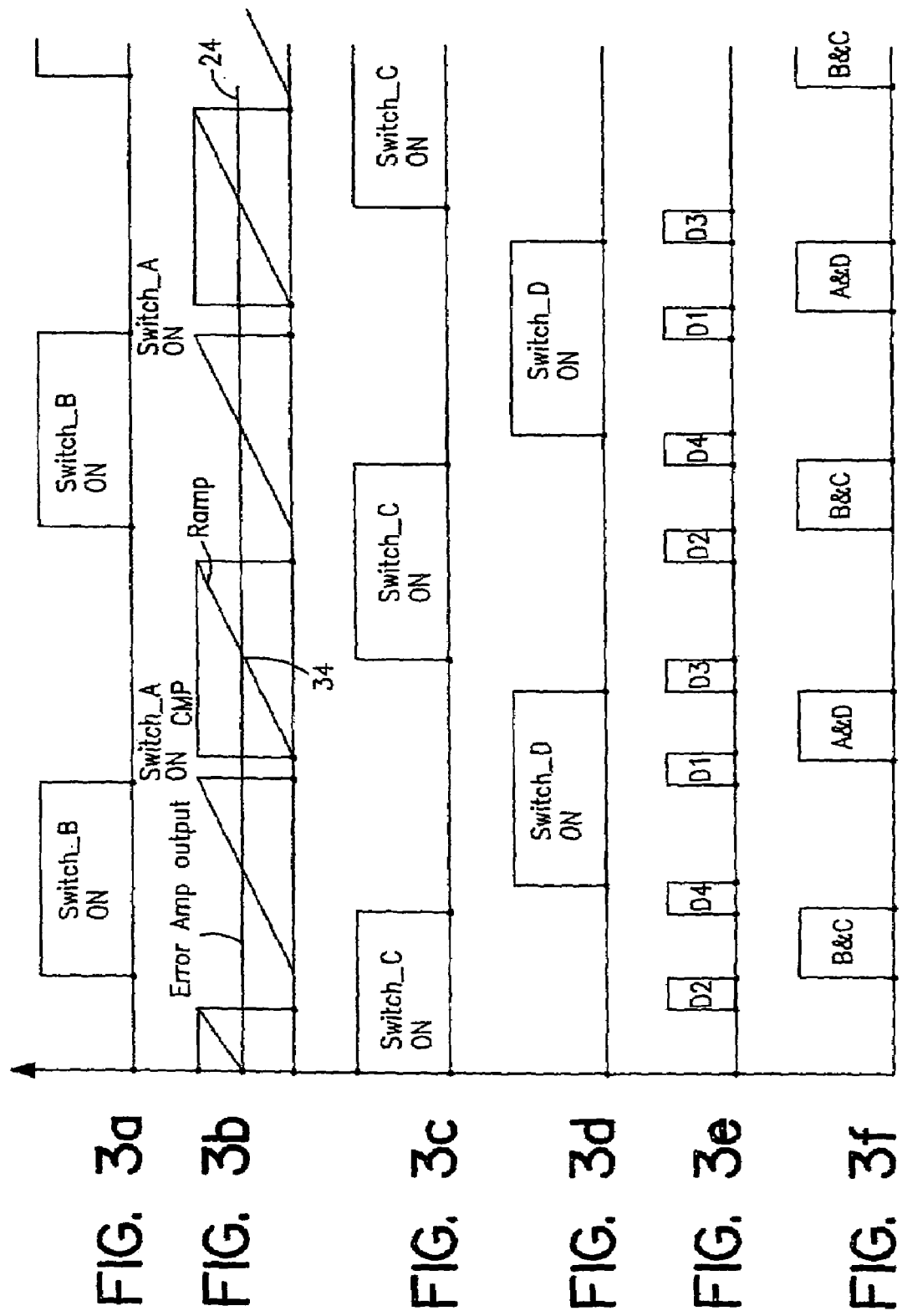

HIGH-EFFICIENCY ADAPTIVE DC/AC CONVERTER

REFERENCE TO PRIOR U.S. APPLICATION

This application is a continuation of and claims priority to the co-pending patent application, Ser. No. 10/132,016, entitled "High-Efficiency Adaptive DC/AC Converter" with filing date Apr. 24, 2002 and assigned to the assignee of the present invention, the disclosure of which is hereby incorporated herein by reference.

1. FIELD OF THE INVENTION

The present invention is directed to a DC to AC power converter circuit. More particularly, the present invention provides a high efficiency controller circuit that regulates power delivered to a load using a zero-voltage-switching technique. General utility for the present invention is found as a circuit for driving one or more Cold Cathode Fluorescent Lamps (CCFLs), however, those skilled in the art will recognize that the present invention can be utilized with any load where high efficiency and precise power control is required.

2. DESCRIPTION OF RELATED ART

FIG. 1 depicts a convention CCFL power supply system 10. The system broadly includes a power supply 12, a CCFL driving circuit 16, a controller 14, a feedback loop 18, and one or more lamps CCFL associated with an LCD panel 20. Power supply 12 supplies a DC voltage to circuit 16, and is controlled by controller 14, through transistor Q3. Circuit 16 is a self-resonating circuit, known as a Royer circuit. Essentially, circuit 16 is a self-oscillating dc to ac converter, whose resonant frequency is set by L1 and C1, and N1-N4 designate transformer windings and number of turns of the windings. In operation, transistors Q1 and Q2 alternately conduct and switch the input voltage across windings N1 and N2, respectively. If Q1 is conducting, the input voltage is placed across winding N1. Voltages with corresponding polarity will be placed across the other windings. The induced voltage in N4 makes the base of Q2 positive, and Q1 conducts with very little voltage drop between the collector and emitter. The induced voltage at N4 also holds Q2 at cutoff. Q1 conducts until the flux in the core of TX1 reaches saturation.

Upon saturation, the collector of Q1 rises rapidly (to a value determined by the base circuit), and the induced voltages in the transformer decrease rapidly. Q1 is pulled further out of saturation, and $V_{CE}$ rises, causing the voltage across N1 to further decrease. The loss in base drive causes Q1 to turn off, which in turn causes the flux in the core to fall back slightly and induces a current in N4 to turn on Q2. The induced voltage in N4 keeps Q1 conducting in saturation until the core saturates in the opposite direction, and a similar reversed operation takes place to complete the switching cycle.

Although the inverter circuit 16 is composed of relatively few components, its proper operation depends on complex interactions of nonlinearities of the transistors and the transformer. In addition, variations in C1, Q1 and Q2 (typically, 35% tolerance) do not permit the circuit 16 to be adapted for parallel transformer arrangements, since any duplication of the circuit 16 will produce additional, undesirable operating frequencies, which may resonate at certain harmonics. When applied to a CCFL load, this circuit produces a "beat" effect in the CCFLs, which is both noticeable and undesirable. Even if the tolerances are closely matched, because circuit 16 operates in self-resonant mode, the beat effects cannot be removed, as any duplication of the circuit will have its own unique operating frequency.

Some other driving systems can be found in U.S. Pat. Nos. 5,430,641; 5,619,402; 5,615,093; 5,818,172. Each of these references suffers from low efficiency, two-stage power conversion, variable-frequency operation, and/or load dependence. Additionally, when the load includes CCFL(s) and assemblies, parasitic capacitances are introduced, which affects the impedance of the CCFL itself. In order to effectively design a circuit for proper operation, the circuit must be designed to include consideration of the parasitic impedances for driving the CCFL load. Such efforts are not only time-consuming and expensive, but it is also difficult to yield an optimal converter design when dealing with various loads. Therefore, there is a need to overcome these drawbacks and provide a circuit solution that features high efficiency, reliable ignition of CCFLs, load-independent power regulation and single frequency power conversion.

SUMMARY OF THE INVENTION

Accordingly, the present invention provides an optimized system for driving a load, obtains an optimal operation for various LCD panel loads, thereby improving the reliability of the system.

Broadly defined, the present invention provides A DC/AC converter circuit for controllably delivering power to a load, comprising an input voltage source; a first plurality of overlapping switches and a second plurality of overlapping switches being selectively coupled to said voltage source, the first plurality of overlapping switches defining a first conduction path, the second plurality of overlapping switches defining a second conduction path. A pulse generator is provided to generate a pulse signal. Drive circuitry receives the pulse signal and controls the conduction state of the first and second plurality of switches. A transformer is provided having a primary side and a secondary side, the primary side is selectively coupled to the voltage source in an alternating fashion through the first conduction path and, alternately, through the second conduction path. A load is coupled to the secondary side of the transformer. A feedback loop circuit is provided between the load and the drive circuitry that supplies a feedback signal indicative of power being supplied to the load. The drive circuitry alternates the conduction state of the first and second plurality of switches, and the overlap time of the switches in the first plurality of switches, and the overlap time of the switches in the second plurality of switches, to couple the voltage source to the primary side based at least in part on the feedback signal and the pulse signal.

The drive circuitry is constructed to generate a first complimentary pulse signal from the pulse signal, and a ramp signal from the pulse signal. The pulse signal is supplied to a first one of the first plurality of switches to control the conduction state thereof, and the ramp signal is compared with at least the feedback signal to generate a second pulse signal, where a controllable conduction overlap condition exists between the conduction state of the first and second switches of the first plurality of switches. The second pulse signal is supplied to a second one of the first plurality of switches and controlling the conduction state thereof. The drive circuitry further generates a second complimentary pulse signal based on the second pulse signal, wherein said first and second complimentary pulse signals control the conduction state of a first and second ones of the second plurality of switches, respectively. Likewise, a controllable conduction overlap condition exists between the conduction state of the first and second switches of the second plurality of switches.

In method form, the present invention provides a method for controlling a zero-voltage switching circuit to deliver power to a load comprising the steps of supplying a DC voltage source; coupling a first and second transistor defining a first conduction path and a third and fourth transistor defining a second conduction path to the voltage source and a primary side of a transformer; generating a pulse signal to having a predetermined pulse width; coupling a load to a secondary side of said transformer; generating a feedback signal from the load; and controlling the feedback signal and the pulse signal to determine the conduction state of said first, second, third and fourth transistors.

In the first embodiment, the present invention provides a converter circuit for delivering power to a CCFL load, which includes a voltage source, a transformer having a primary side and a secondary side, a first pair of switches and a second pair of switches defining a first and second conduction path, respectively, between the voltage source and the primary side, a CCFL load circuit coupled to the secondary side, a pulse generator generating a pulse signal, a feedback circuit coupled to the load generating a feedback signal, and drive circuitry receiving the pulse signal and the feedback signal and coupling the first pair of switches or the second pair of switches to the voltage source and the primary side based on said pulse signal and said feedback signal to deliver power to the CCFL load.

Additionally, the first embodiment provides a pulse generator that generates a pulse signal having a predetermined frequency. The drive circuitry includes first, second, third and fourth drive circuits; and the first pair of switches includes first and second transistors, and the second pair of switches includes third and fourth transistors. The first, second, third and fourth drive circuits are connected to the control lines of the first, second, third and fourth transistors, respectively. The pulse signal is supplied to the first drive circuit so that the first transistor is switched in accordance with the pulse signal. The third drive circuit generates a first complimentary pulse signal and a ramp signal based on the pulse signal, and supplies the first complimentary pulse signal to the third transistor so that the third transistor is switched in accordance with the first complimentary pulse signal. The ramp signal and the feedback signal are compared to generate a second pulse signal. The second pulse signal is supplied to the second drive circuit so that the second transistor is switched in accordance with the second pulse signal. The forth driving circuit generates a second complementary pulse signal based on the second pulse signal and supplies the second complementary pulse signal to the fourth transistor so that the fourth transistor is switched in accordance with the second complimentary pulse signal. In the present invention, the simultaneous conduction of the first and second transistors, and the third and fourth transistors, respectively, controls the amount of power delivered to the load. The pulse signal and the second pulse signal are generated to overlap by a controlled amount, thus delivering power to the load along the first conduction path. Since the first and second complementary pulse signals are generated from the pulse signal and second pulse signal, respectively, the first and second complementary pulse signals are also generated to overlap by a controlled amount, power is delivered to the load along the second conduction path, in an alternating fashion between the first and second conduction paths.

Also, the pulse signal and first complementary pulse signal are generated to be approximately 180° out of phase, and the second pulse signal and the second complementary signal are generated to be approximately 180° out of phase, so that a short circuit condition between the first and second conduction paths is avoided In addition to the converter circuit provided in the first embodiment, the second embodiment includes a flip-flop circuit coupled to the second pulse signal, which triggers the second pulse signal to the second drive signal only when the third transistor is switched into a conducting state. Additionally, the second embodiment includes, a phase-lock loop (PLL) circuit having a first input signal from the primary side and a second input signal using the feedback signal. The PLL circuit compares the phase difference between these two signals and supplies a control signal to the pulse generator to control the pulse width of the pulse signal based on the phase difference between the first and second inputs.

In both embodiments, the preferred circuit includes the feedback control loop having a first comparator for comparing a reference signal with the feedback signal and producing a first output signal. A second comparator is provided for comparing said first output signal with the ramp signal and producing said second pulse signal based on the intersection of the first output signal and the ramp signal. The feedback circuit also preferably includes a current sense circuit receiving the feedback signal and generating a trigger signal, and a switch circuit between the first and second comparator, the switch circuit receiving the trigger signal and generating either the first output signal or a predetermined minimum signal, based on the value of the trigger signal. The reference signal can include, for example, a signal that is manually generated to indicate a desires power to be delivered to the load. The predetermined minimum s voltage signal can include a programmed minimum voltage supplied to the switches, so that an overvoltage condition does not appear across the load.

Likewise, in both embodiments described herein, an overcurrent protection circuit can be provided that receives the feedback signal and controls the pulse generator based on the value of said feedback signal. An overvoltage protection can be provided to receive a voltage signal from across the load and the first output signal and compare the voltage signal from across the load and the first output signal, to control the pulse generator based on the value of the voltage signal from across the load.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIGS. 2a-2f is an exemplary timing diagram of the circuit of FIG. 2.

FIGS. 3a-3f is an exemplary timing diagram of the circuit of FIG. 3; and

DETAILED DESCRIPTION OF THE INVENTION

While not wishing to be bound by example, the following Detailed Description will proceed with reference to a CCFL panel as the load for the circuit of the present invention. However, it will be apparent that the present invention is not limited only to driving one or CCFLs, rather, the present invention should be broadly construed as a power converter circuit and methodology independent of the particular load for a particular application.

As an overview, the present invention provides circuitry to controllably deliver power to a load using feedback signals and pulse signals to adjust the ON time of two pairs of switches. When one pair of switches are controllably turned ON such that their ON times overlap, power is delivered to a load (via a transformer), along a conduction path defined by the pair of switches. Likewise, when the other pair of switches are controllably turned ON such that their ON times overlap, power is delivered to a load (via a transformer), along a conduction path defined by other pair of switches. Thus, by selectively turning ON switches and controlling the overlap between-switches, the present invention can precisely control power delivered to a given load. Additionally, the present invention includes over-current and over-voltage protection circuits, which discontinues power to the load in the event of a short circuit or open circuit condition. Moreover, the controlled switching topology described herein enables the circuit to operate irrespective of the load, and with a single operating frequency independent of the resonant effects of the transformer arrangement. These features are discussed below with reference to the drawings.

Figure 1:
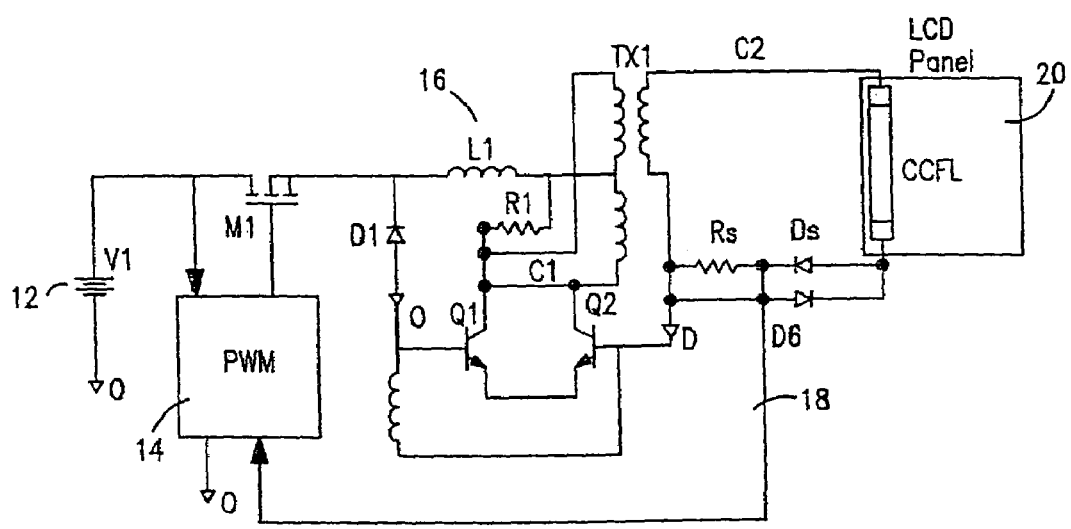
FIG. 1 is a conventional DC/AC converter circuit.
Figure 2:
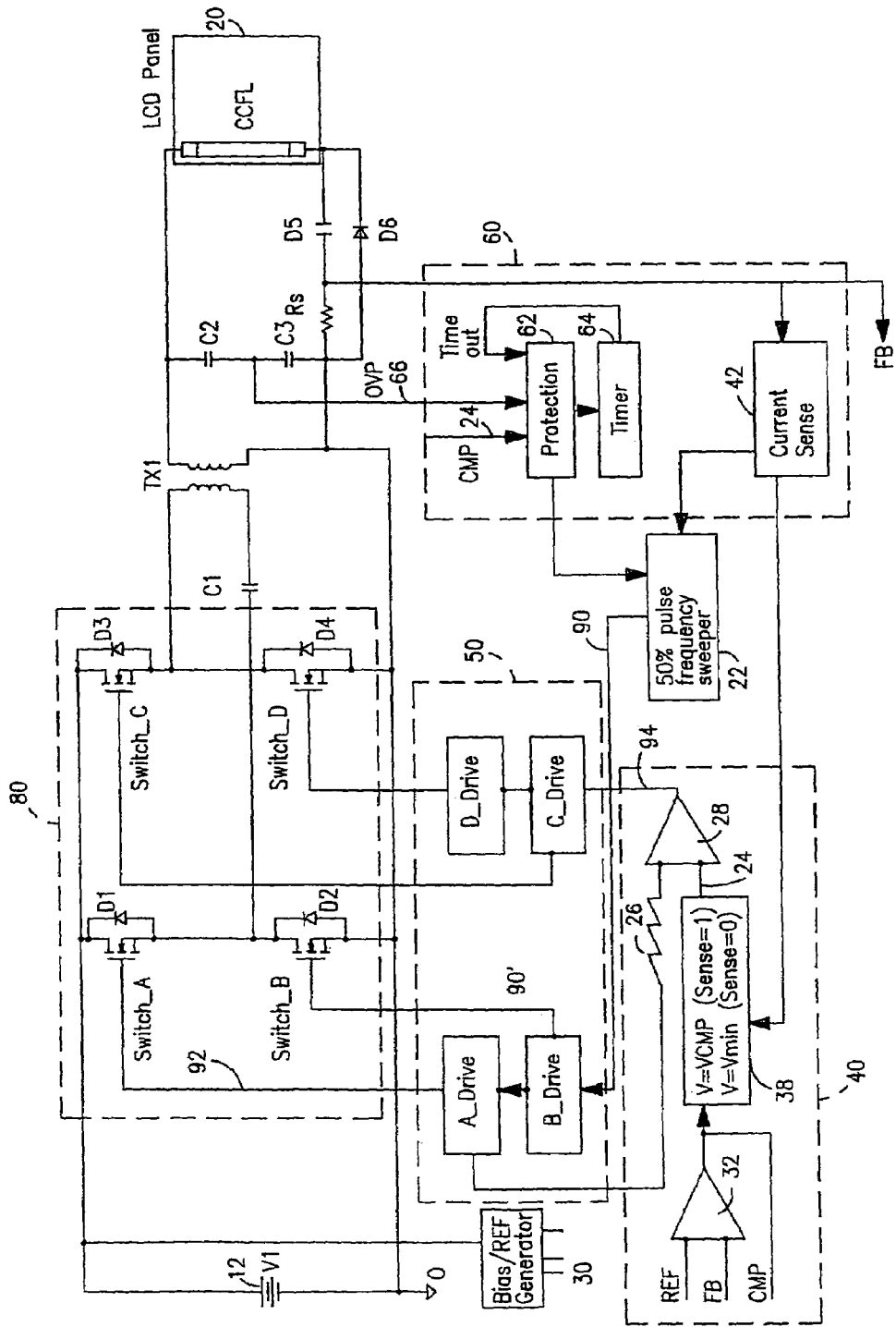
FIG. 2 is one preferred embodiment of a DC/AC converter circuit of the present invention.

The circuit diagram shown in FIG. 2 illustrates one preferred embodiment of a phase-shift, full-bridge, zero-voltage-switching power converter of the present invention. Essentially, the circuit shown in FIG. 2 includes a power source 12, a plurality of switches 80 arranged as diagonal pairs of switches defining alternating conduction paths, drive circuitry 50 for driving each of the switches, a frequency sweeper 22 which generates a square wave pulse to the drive circuitry 50, a transformer TX1 (with an associated resonant tank circuit defined by the primary side of TX1 and C1) and a load. Advantageously, the present invention also includes an overlap feedback control loop 40 which controls the ON time of at least one of each pair of switches, thereby permitting controllable power to be delivered to the load.

A power source 12 is applied to the system. Initially, a bias/reference signal 30 is generated for the control circuitry (in control loop 40) from the supply. Preferably, a frequency sweeper 22 generates a 50% duty-cycle pulse signal, starting with an upper frequency and sweeping downwards at a pre-determined rate and at pre-determined steps (i.e., square wave signal of variable pulse width). The frequency sweeper 22 preferably is a programmable frequency generator, as is known in the art. The pulse signal 90 (from the sweeper 22) is delivered to B_Drive (which drives the Switch_B, i.e., controls the gate of Switch_B), and is delivered to A_Drive, which generates a complementary pulse signal 92 and a ramp signal 26. The complementary pulse signal 92 is approximately 180° out of phase with pulse signal 90, and the ramp signal 26 is approximately 90° out of phase with pulse signal, as will be described below. The ramp signal is preferably a sawtooth signal, as shown in the Figure. The ramp signal 26 is compared with the output signal 24 (referred to herein as CMP) of the error amplifier 32, through comparator 28, thus generating signal 94. The output signal 94 of the comparator 28 is likewise a 50% duty pulse delivered to C_Drive to initiate the turning on of Switch_C which, in turn, determines the amount of overlap between the switches B and C, and switches A and D. Its complimentary signal (phased approximately 180°) is applied to Switch_D, via D_Drive. It will be understood by those skilled in the art that circuits Drive_A-Drive_D are connected to the control lines (e.g., gate) of Switch_A-Switch_D, respectively, which permits each of the switches to controllably conduct, as described herein. By adjusting the amount of overlap between switches B, C and A, D, lamp-current regulation is achieved. In other words, it is the amount of overlapping in the conduction state of the pairs of switches that determines the amount of power processed in the converter. Hence, switches B and C, and switches A and D, will be referred to herein as overlapping switches.

While not wishing to be bound by example, in this embodiment, B_Drive is preferably formed of a totem pole circuit, generic low-impedance op-amp circuit, or emitter follower circuit. C_Drive is likewise constructed. Since both A-Drive and D_Drive are not directly connected to ground (i.e., floating), it is preferred that these drives are formed of a boot-strap circuit, or other high-side drive circuitry known in the art. Additionally, as stated above, A_Drive and D_Drive include an inverter to invert (i.e., phase) the signal flowing from B_Drive and C_Drive, respectively.

High-efficiency operation is achieved through a zero-voltage-switching technique. The four MOSFETs (Switch_A-Switch_D) 80 are turned on after their intrinsic diodes (D1-D4) conduct, which provides a current flowing path of energy in the transformer/capacitor (TX1/C1) arrangement, thereby ensuring that a zero voltage is across the switches when they are turned on. With this controlled operation, switching loss is minimized and high efficiency is maintained.

The preferred switching operation of the overlapping switches 80 is shown with reference to the timing diagrams of FIGS. 2a-2f. Switch_C is turned off at certain period of the conduction of both switches B and C (FIG. 2f). The current flowing in the tank (refer to FIG. 2) is now flowing through diode D4 (FIG. 2e) in Switch_D, the primary of transformer, C1, and Switch_B, after Switch_C is turned off, thereby resonating the voltage and current in capacitor C1 and the transformer as a result of the energy delivered when switches B and C were conducting (FIG. 2f). Note that this condition must occur, since an instantaneous change in current direction of the primary side of the transformer would violate Faraday's Law. Thus, current must flow through D4 when Switch_C turns off. Switch_D is turned on after D4 has conducted. Similarly, Switch_B is turned off (FIG. 2a), the current diverts to Diode D1 associated with Switch_A before Switch_A is turned on (FIG. 2e). Likewise, Switch_D is turned off (FIG. 2d), and the current is now flowing now from Switch_A, through C1, the transformer primary and Diode D3. Switch_C is turned on after D3 has conducted (FIG. 2e). Switch_B is turned on after Switch_A is turned off which allows the diode D2 to conduct first before it is turned on. Note that the overlap of turn-on time of the diagonal switches B,C and A,D determines the energy delivered to the transformer, as shown in FIG. 2f.

In this embodiment, FIG. 2b shows that the ramp signal 26 is generated only when Switch_A is turned on. Accordingly, Drive_A, which generates the ramp signal 26, preferably includes a constant current generator circuit (not shown) that includes a capacitor having an appropriate time constant to create the ramp signal. To this end, a reference current (not shown) is utilized to charge the capacitor, and the capacitor is grounded (via, for example a transistor switch) so that the discharge rate exceeds the charge rate, thus generating the sawtooth ramp signal 26. Of course, as noted above, this can be accomplished by integrating the pulse signal 90, and thus, the ramp signal 26 can be formed using an integrator circuit (e.g., op-amp and capacitor).

In the ignition period, a pre-determined minimum overlap between the two diagonal switches is generated (i.e., between switches A,D and B,C). This gives a minimum energy from the input to the tank circuit including C1, transformer, C2, C3 and the CCFL load. Note that the load can be resistive and/or capacitive. The drive frequency starts at a predetermined upper frequency until it approaches the resonant frequency of the tank circuit and equivalent circuit reflected by the secondary side of the transformer, a significant amount of energy is delivered to the load where the CCFL is connected. Due to its high-impedance characteristics before ignition, the CCFL is subjected to high voltage from the energy supplied to the primary side. This voltage is sufficient to ignite the CCFL. The CCFL impedance decreases to its normal operating value (e.g., about 100 Kohm to 130 Kohm), and the energy supplied to the primary side based on the minimum-overlap operation is no longer sufficient to sustain a steady state operation of the CCFL. The output of the error amplifier 26 starts its regulating function to increase the overlap. It is the level of the error amplifier output determines the amount of the overlap. For example:

Referring to FIGS. 2b and 2c and the feedback loop 40 of FIG. 2, it is important to note that Switch_C is turned on when the ramp signal 26 (generated by Drive_A) is equal to the value of signal CMP 24 (generated by error amplifier 32), determined in comparator 28. This is indicated as the intersection point 36 in FIG. 2b. To prevent a short circuit, switches A,B and C,D must never be ON simultaneously. By controlling the CMP level, the overlap time between switches A,D and B,C regulates the energy delivered to the transformer. To adjust the energy delivered to the transformer (and thereby adjust the energy delivered to the CCFL load), switches C and D are time-shifted with respect to switches A and B, by controlling the error amplifier output, CMP 24. As can be understood by the timing diagrams, if the driving pulses from the output of comparator 28 into switches C and D are shifted to the right by increasing the level of CMP, an increase in the overlap between switches A,C and B,D is realized, thus increasing the energy delivered to the transformer. In practice, this corresponds to the higher-lamp current operation. Conversely, shifting the driving pulses of switches C and D to the left (by decreasing the CMP signal) decreases the energy delivered.

To this end, error amplifier 32 compares the feedback signal FB with a reference voltage REF. FB is a measure of the current value through the sense resistor Rs, which is indicative of the total current through the load 20. REF is a signal indicative of the desired load conditions, e.g., the desired current to flow through the load. During normal operation, REF=FB. If, however, load conditions are intentionally offset, for example, from a dimmer switch associated with an LCD panel display, the value of REF will increase/decrease accordingly. The compared value generates CMP accordingly. The value of CMP is reflective of the load conditions and/or an intentional bias, and is realized as the difference between REF and FB (i.e., REF−FB).

To protect the load and circuit from an open circuit condition at the load (e.g., open CCFL lamp condition during normal operation), the FB signal is also preferably compared to a reference value (not shown and different from the REF signal described above) at the current sense comparator 42, the output of which defines the condition of switch 28, discussed below. This reference value can be programmable, and/or user-definable, and preferably reflects the minimum or maximum current permitted by the system (for example, as may be rated for the individual components, and, in particular, the CCFL load). If the value of the feedback FB signal and the reference signal is within a permitted range (normal operation), the output of the current sense comparator is 1 (or, HIGH). This permits CMP to flow through switch 38, and the circuit operates as described herein to deliver power to the load. If, however, the value of the FB signal and the reference signal is outside a predetermined range (open circuit or short circuit condition), the output of the current sense comparator is 0 (or, LOW), prohibiting the CMP signal from flowing through the switch 38. (Of course, the reverse can be true, in which the switch triggers on a LOW condition). Instead a minimal voltage Vmin is supplied by switch 38 (not shown) and applied to comparator 28 until the current sense comparator indicates permissible current flowing through Rs. Accordingly, switch 38 includes appropriate programmable voltage selection Vmin for when the sense current is 0. Turning again to FIG. 2b, the effect of this operation is a lowering of the CMP DC value to a nominal, or minimum, value (i.e., CMP=Vmin) so that a high voltage condition is not appearing on the transformer TX1. Thus, the crossover point 36 is shifted to the left, thereby decreasing the amount of overlap between complementary switches (recall Switch_C is turned ON at the intersection point 36). Likewise, current sense comparator 42 is connected to the frequency generator 22 to turn the generator 22 off when the sense value is 0 (or some other preset value indicative of an open-circuit condition). The CMP is fed into the protection circuit 62. This is to shut off the frequency sweeper 22 if the CCFL is removed during operation (open-circuit condition).

To protect the circuit from an over-voltage condition, the present embodiment preferably includes protection circuit 60, the operation of which is provided below (the description of the over current protection through the current sense comparator 42 is provided above). The circuit 60 includes a protection comparator 62 which compares signal CMP with a voltage signal 66 derived from the load 20. Preferably, voltage signal is derived from the voltage divider C2 and C3 (i.e., in parallel with load 20), as shown in FIG. 2. In the open-lamp condition, the frequency sweeper continues sweeping until the OVP signal 66 reaches a threshold. The OVP signal 62 is taken at the output capacitor divider C2 and C3 to detect the voltage at the output of the transformer TX1. To simplify the analysis, these capacitors also represent the lump capacitor of the equivalent load capacitance. The threshold is a reference and circuit is being designed so that the voltage at the secondary side of the transformer is greater than the minimum striking voltage (e.g., as may be required by the LCD panel) while less than the rated voltage of the transformer. When OVP exceeds the threshold, the frequency sweeper stops the frequency sweeping. Meanwhile, the current-sense 42 detects no signal across the sense resistor Rs. Therefore the signal at 24, the output of a switch block 38, is set to be at minimum value so that minimum overlap between switches A,C and B,D is seen. Preferably, a timer 64 is initiated once the OVP exceeds the threshold, thereby initiating a time-out sequence. The duration of the time-out is preferably designed according to the requirement of the loads (e.g., CCFLs of an LCD panel), but could alternately be set at some programmable value. Drive pulses are disabled once the time-out is reached, thus providing safe-operation output of the converter circuit. That is, circuit 60 provides a sufficient voltage to ignite the lamp, but will shut off after a certain period if the lamp is not connected to the converter, so that erroneous high voltage is avoided at the output. This duration is necessary since a non-ignited lamp is similar to an open-lamp condition.

Figure 3:
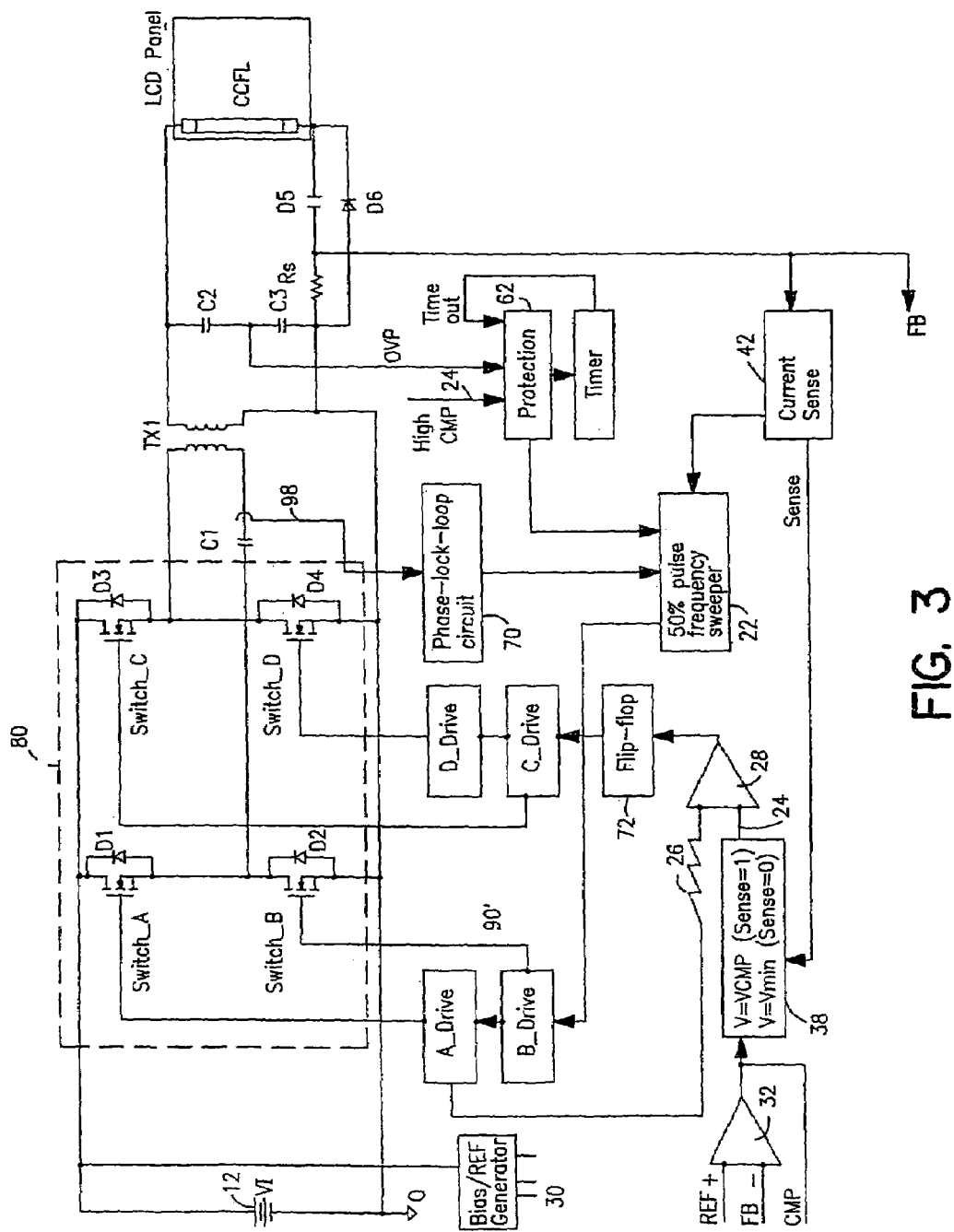
FIG. 3 is another preferred embodiment of a DC/AC converter circuit of the present invention.

FIGS. 3 and 3a-3f depict another preferred embodiment of the DC/AC circuit of the present invention. In this embodiment, the circuit operates in a similar manner as provided in FIG. 2 and FIGS. 2a-2f, however this embodiment further includes a phase lock loop circuit (PLL) 70 for controlling the frequency sweeper 22, and a flip-flop circuit 72 to time the input of a signal into C_Drive. As can be understood by the timing diagrams, if the 50% driving pulses of switches C and D are shifted to the right by increasing the level of CMP, an increase in the overlap between switches A,C and B,D is realized, thus increasing the energy delivered to the transformer. In practice, this corresponds to the higher-lamp current operation (as may be required, e.g., by a manual increase in the REF voltage, described above). Conversely, shifting the driving pulses of switches C and D to the left (by decreasing the CMP signal) decreases the energy delivered. The phase-lock-loop circuit 70 maintains the phase relationship between the feedback current (through Rs) and tank current (through TX1/C1) during normal operation, as shown in FIG. 3. The PLL circuit 70 preferably includes input signals from the tank circuit (C1 and the primary of TX1) signal 98 and Rs (FB signal, described above). Once the CCFL is ignited, and the current in the CCFL is detected through Rs, the PLL 70 circuit is activated which locks the phase between the lamp current and the current in the primary resonant tank (C1 and transformer primary). That is, the PLL is provided to adjust the frequency of the frequency sweeper 22 for any parasitic variations such as temperature effect, mechanical arrangement like wiring between the converter and the LCD panel and distance between the lamp and metal chassis of LCD panel that affect the capacitance and inductance. Preferably, the system maintains a phase difference of 180 degrees between the resonant tank circuit and the current through Rs (load current). Thus, irrespective of the particular load conditions and/or the operating frequency of the resonant tank circuit, the system finds an optimal operation point.

The operation of the feedback loop of FIG. 3 is similar to the description above for FIG. 2. However, as shown in FIG. 3b, this embodiment times the output of an initiating signal through C_Drive through flip-flop 72. For instance, during normal operation, the output of the error amplifier 32 is fed through the controlled switch block 38 (described above), resulting in signal 24. A certain amount of overlap between switches A,C and B,D is seen through comparator 28 and flip-flop 72 which drives switches C and D (recall D_Drive produces the complementary signal of C_Drive). This provides a steady-state operation for the CCFL (panel) load. Considering the removal of the CCFL (panel) during the normal operation, CMP rises to the rail of output of the error amplifier and triggers the protection circuit immediately. This function is inhibited during the ignition period.

Referring briefly to FIGS. 3a-3f, the triggering of switches C and D, through C-Drive and D_Drive, is, in this embodiment, alternating as a result of the flip-flop circuit 72. As is shown in FIG. 3b, the flip-flop triggers every other time, thereby initiating C_Drive (and, accordingly, D_Drive). The timing otherwise operates in the same way as discussed above with reference to FIGS. 2a-2f.

Figure 4A:
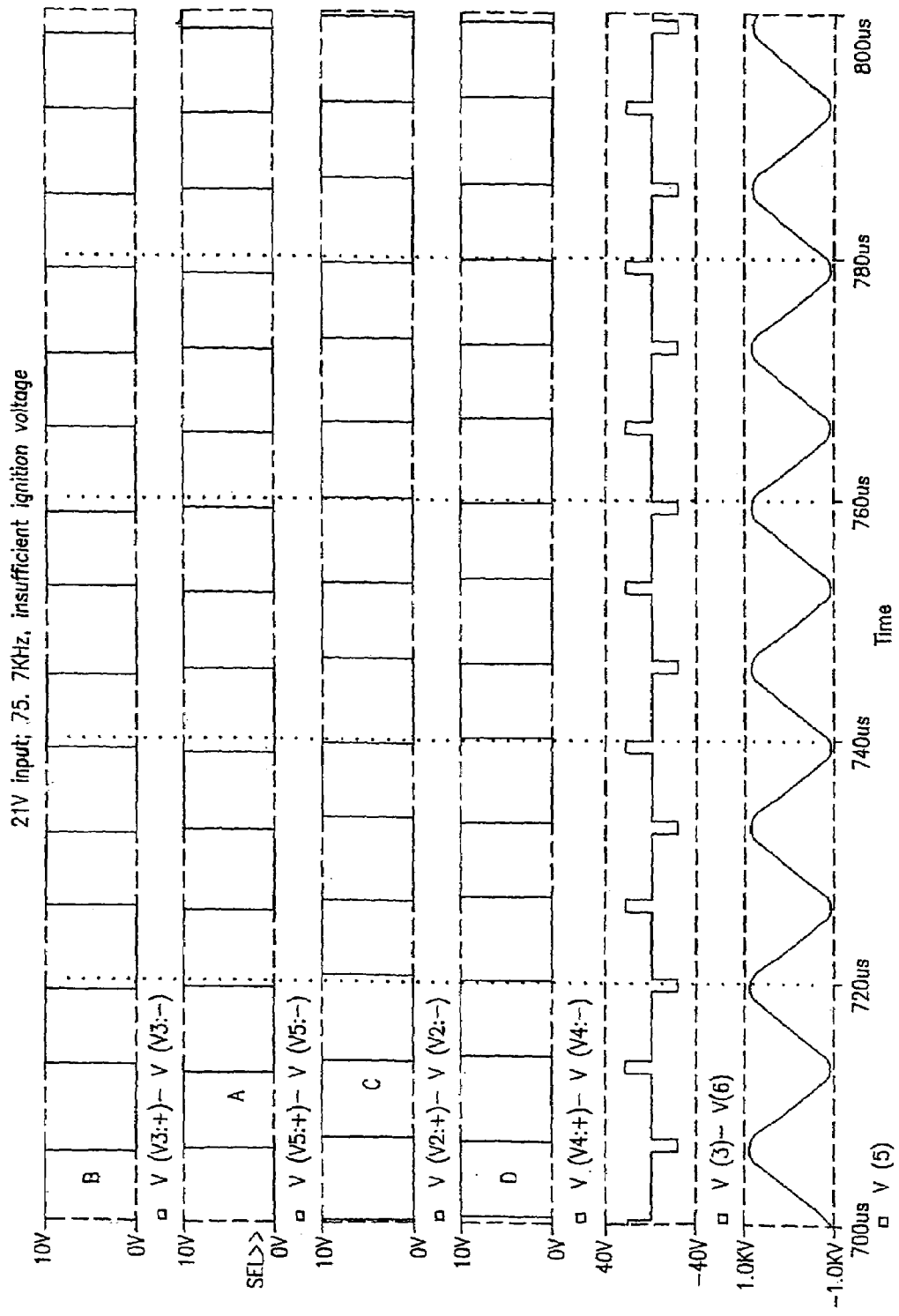
FIGS. 4a-4f depict emulation diagrams for the circuits shown in FIGS. 2 and 3.
Figure 4B:
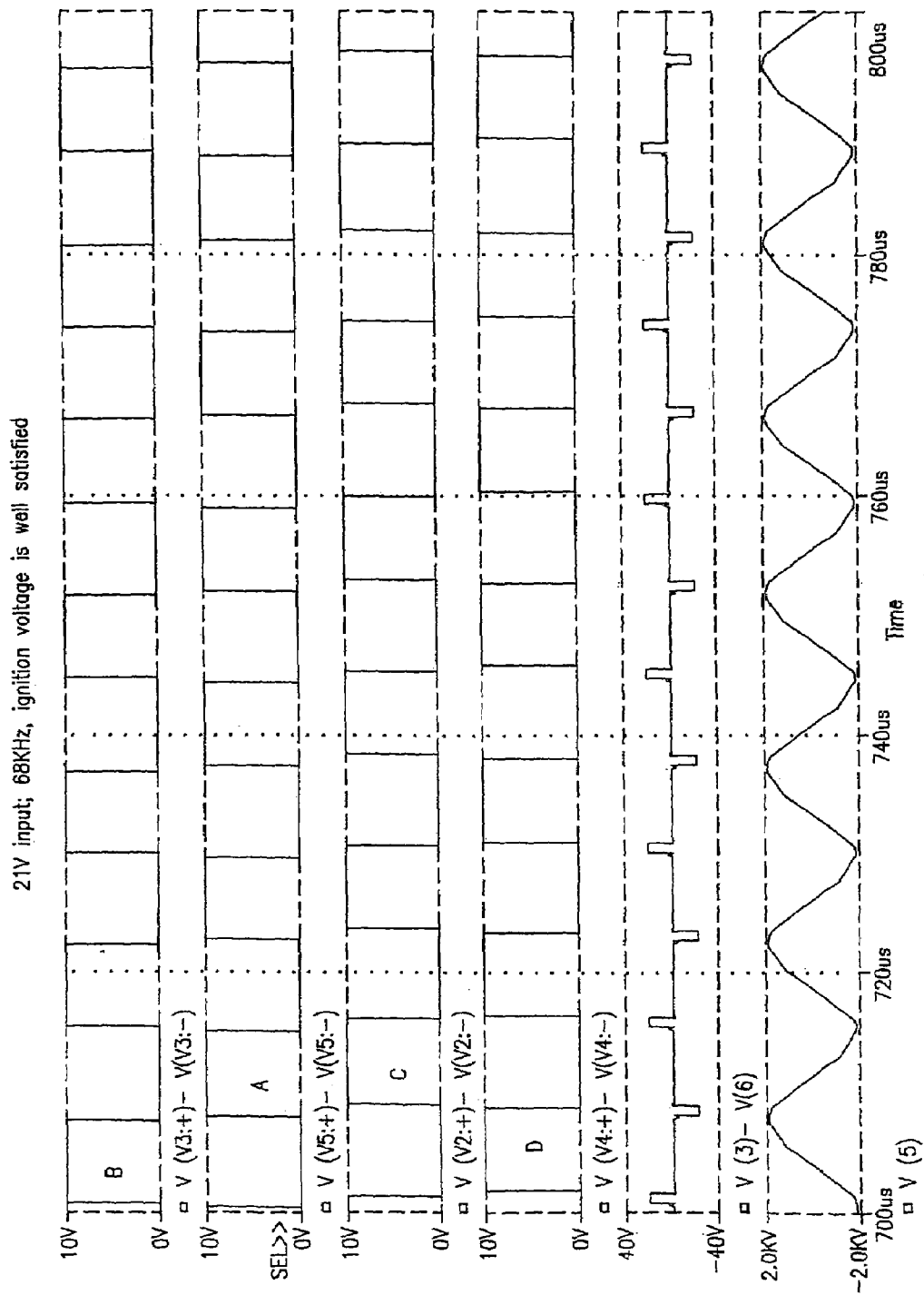
Figure 4C:
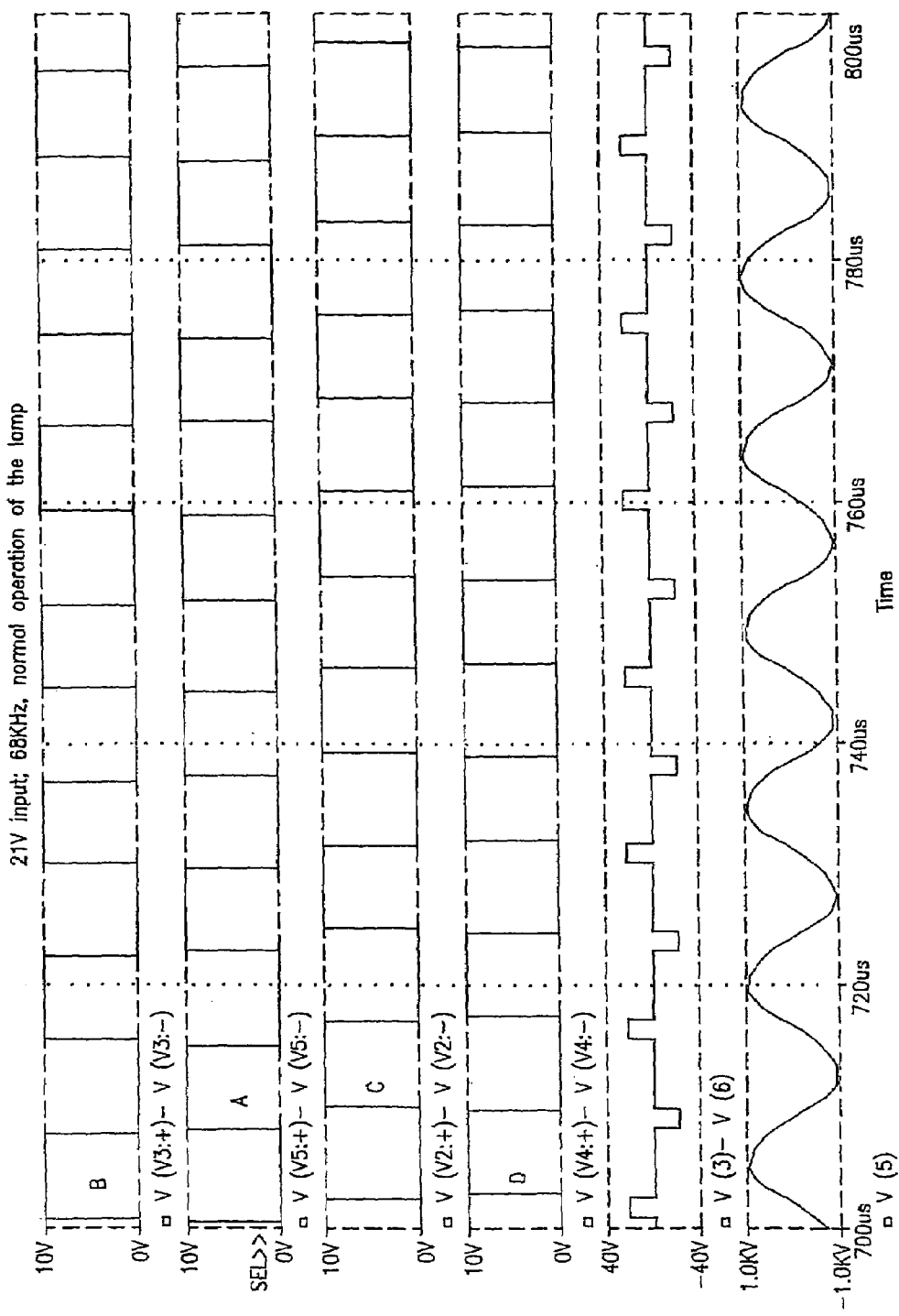
Figure 4D:
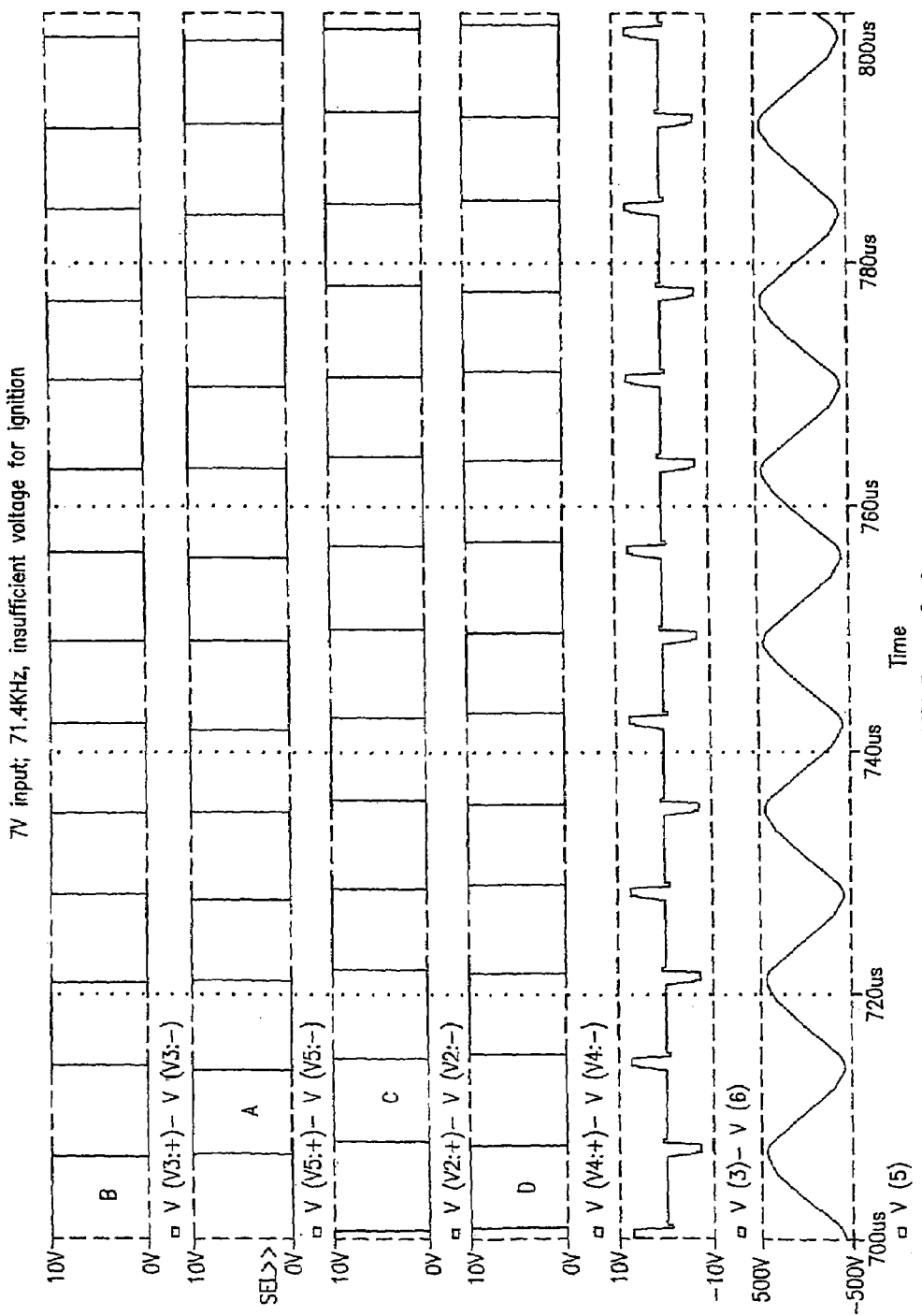
Figure 4E:
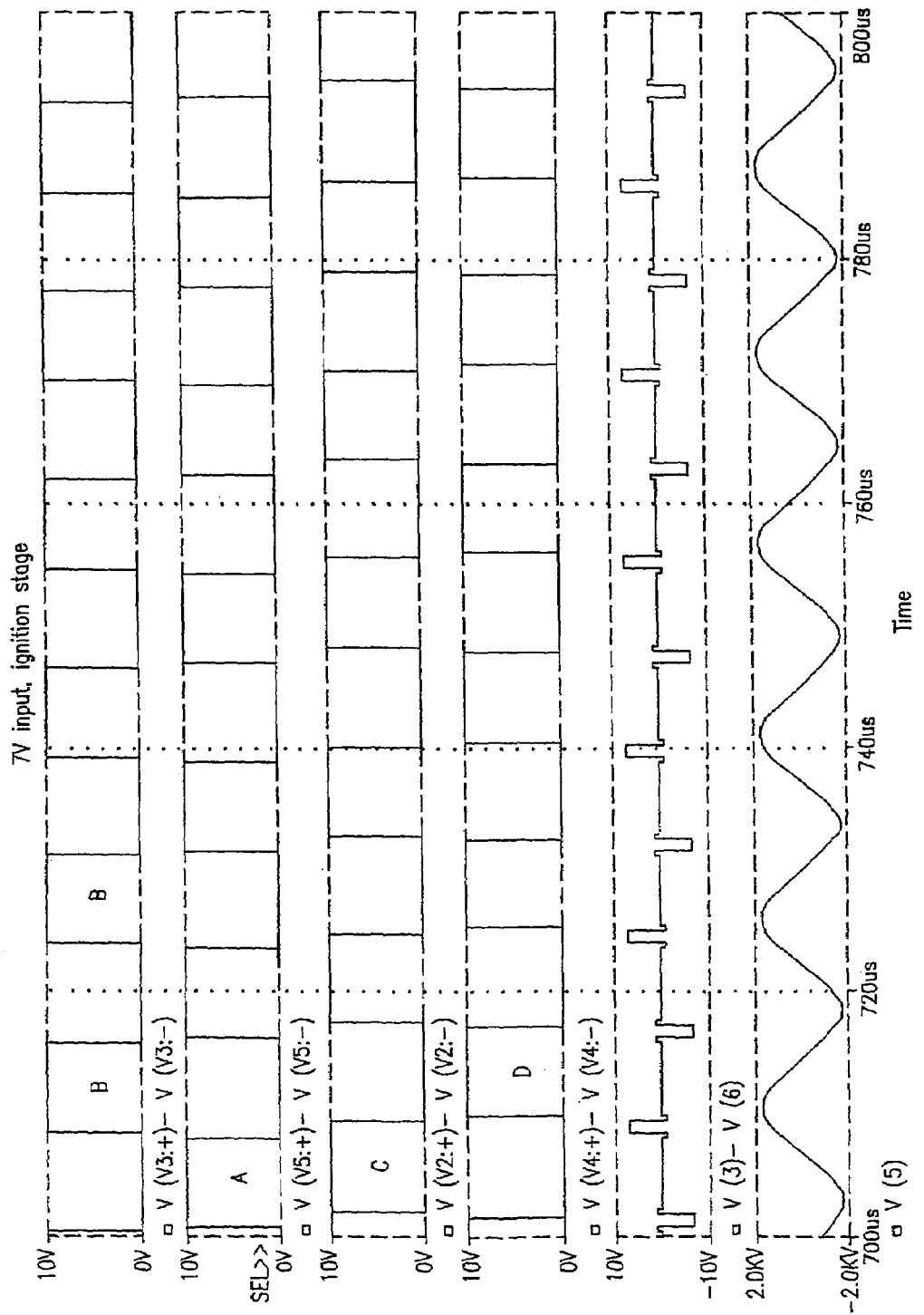
Figure 4F:
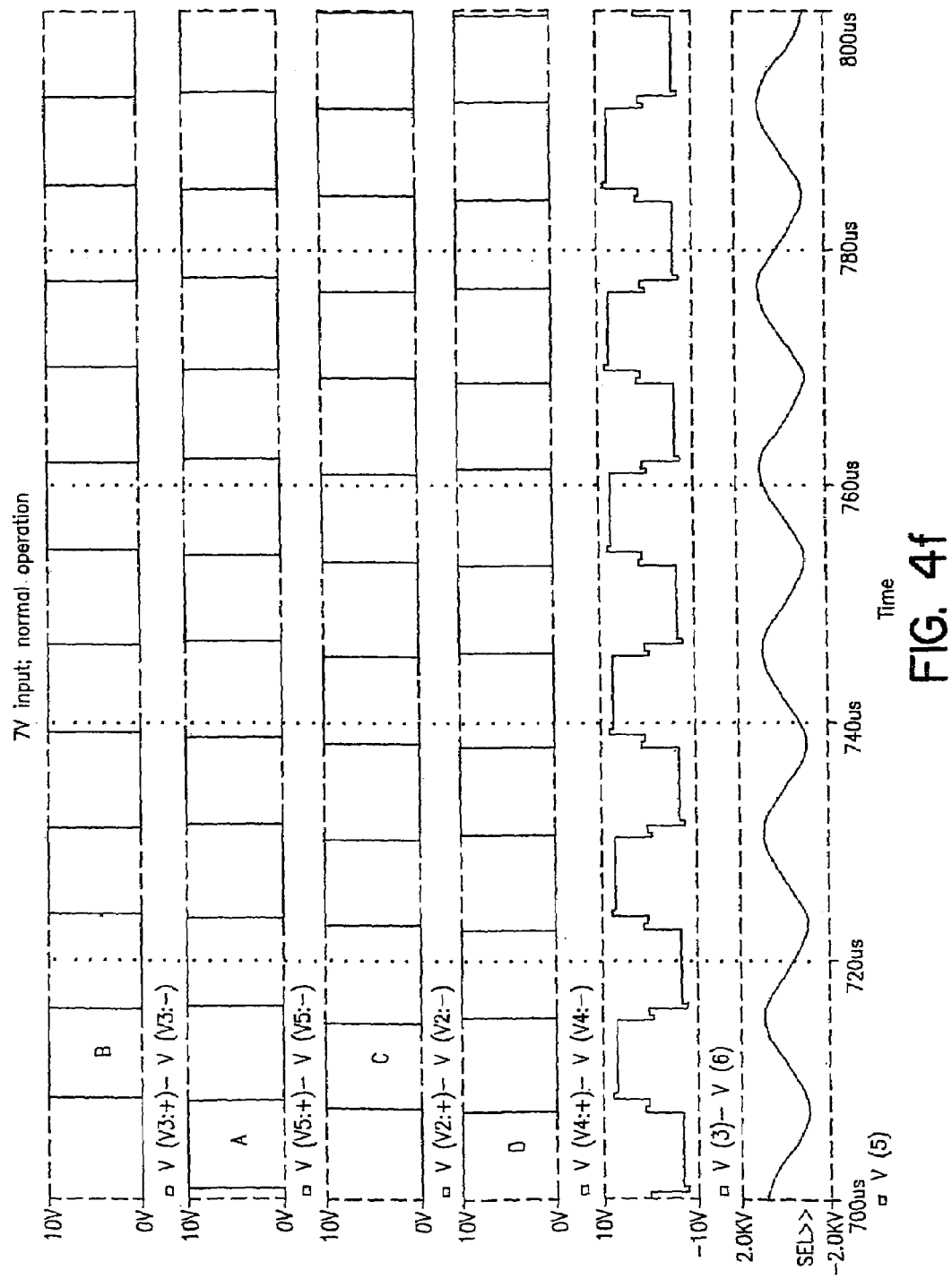

Referring now to FIGS. 4a-4f, the output circuit of FIG. 2 or 3 is emulated. For example, FIG. 4a shows that at 21V input, when the frequency sweeper approaches 75.7 KHz (0.5 us overlapping), the output is reaching 1.67 KVp-p. This voltage is insufficient to turn on the CCFL if it requires 3300 Vp-p to ignite. As the frequency decreases to say 68 KHz, the minimum overlap generates about 3.9 KVp-p at the output, which is sufficient to ignite the CCFL. This is illustrated in FIG. 4b. At this frequency, the overlap increases to 1.5 us gives output about 1.9 KVp-p to operate the 130 Kohm lamp impedance. This has been shown in FIG. 4c. As another example, FIG. 4d illustrates the operation while the input voltage is 7V. At 71.4 KHz, output is 750 Vp-p before the lamp is striking. As the frequency decreases, the output voltage increases until the lamp ignites. FIG. 4e shows that at 65.8 KHz, the output reaches 3500 Vp-p. The regulation of the CCFL current is achieved by adjusting the overlap to support 130 Kohm impedance after ignition. The voltage across the CCFL is now 1.9 KVp-p for a 660 Vrms lamp. This is also illustrated in FIG. 4f. Although not shown, the emulation of the circuit of FIG. 3 behaves in a similar manner.

It should be noted that the difference between the first and second embodiments (i.e., by the addition of the flip flop and the PLL in FIG. 3) will not effect the overall operational parameters set forth in FIGS. 4a-4f. However, the, addition of the PLL has been determined to account for non-ideal impedances that develop in the circuit, and may be added as an alternative to the circuit shown in FIG. 2. Also, the addition of the flip-flop permits the removal of the constant current circuit, described above.

Thus, it is evident that there has been provided a high efficiency adaptive DC/AC converter circuit that satisfies the aims and objectives stated herein. It will be apparent to those skilled in the art that modifications are possible. For example, although the present invention has described the use of MOSFETs for the switched, those skilled in the art will recognize that the entire circuit can be constructed using BJT transistors, or a mix of any type of transistors, including MOSFETs and BJTs. Other modifications are possible. For example, the drive circuitry associated with Drive_B and Drive_D may be comprised of common-collector type circuitry, since the associated transistors are coupled to ground and are thus not subject to floating conditions. The PLL circuit described herein is preferably a generic PLL circuit 70, as is known in the art, appropriately modified to accept the input signal and generate the control signal, described above. The pulse generator 22 is preferably a pulse width modulation circuit (PWM) or frequency width modulation circuit (FWM), both of which are well known in the art. Likewise, the protection circuit 62 and timer are constructed out of known circuits and are appropriately modified to operate as described herein. Other circuitry will become readily apparent to those skilled in the art, and all such modifications are deemed within the spirit and scope of the present invention, only as limited by the appended claims.

The invention claimed is:

1. A DC to AC inverter circuit, comprising:

an input DC voltage source;

a plurality of switches for selectively passing said DC voltage source;

a transformer having a primary side and a secondary side, said primary side being selectively coupled to said DC voltage source and receiving DC voltage from said DC voltage source in an alternating fashion through said switches;

a capacitor divider electrically coupled to a cold cathode fluorescent lamp load for providing a first voltage signal representing a voltage across said cold cathode fluorescent lamp load;

a timer circuit coupled to said capacitor divider for providing a time-out sequence of a predetermined duration when said first voltage signal exceeds a predetermined threshold;

a protection circuit coupled to said timer circuit for shuting down said plurality of switches when said first voltage signal exceeds said predetermined threshold for said predetermined duration; and a feedback control loop circuit coupled to said plurality of switches for receiving a feedback signal indicative of power being supplied to said cold cathode fluorescent lamp load from a component receiving current from said secondary side and for controlling a conduction state of at least one of said switches so that said switches have a plurality of operating modes comprising a first mode in which said switches deliver an amount of power to said cold cathode fluorescent lamp load determined by said feedback signal, and a second mode in which said switches deliver a predetermined minimum power to said cold cathode fluorescent lamp load for a predetermined time duration.

2. A DC to AC inverter circuit as claimed in claim 1, wherein said feedback control loop circuit comprises:

an error amplifier for comparing said feedback signal to a predetermined reference signal and generating an error signal indicative of the difference between said feedback signal and said predetermined reference signal; and a flow-through switch coupled to said error amplifier and having a first conduction state wherein the output of said flow-through switch comprises a DC signal indicative of said first mode of said switches, and a second conduction state wherein the output of said flow-through switch comprises a DC signal indicative of said second mode of said switches.

3. A DC to AC inverter controller circuit comprising:

a plurality of drivers for controlling a plurality of switches in an alternating fashion allowing a transformer to receive DC voltage in an alternating fashion;

a voltage input for electrically coupling to a capacitor divider and to a load and for receiving a first voltage signal representing a voltage across said load;

a timer circuit coupled to said voltage input for providing a time-out sequence of a predetermined duration when said first voltage signal exceeds a predetermined threshold;

a protection circuit coupled to said timer circuit for shutting down said plurality of switches when said first voltage signal exceeds said predetermined threshold for said predetermined duration; and a feedback control circuit for receiving a feedback signal indicative of power being supplied to said load from a component receiving current from a secondary side of said transformer and for controlling a conduction state of at least one of said switches to deliver power to said load not exceeding a predetermined amount during a predetermined start time duration.

4. A liquid crystal display comprising:

a plurality of switches being controlled in an alternating fashion for allowing a transformer to receive DC voltage in an alternating fashion;

a capacitor divider electrically coupled to a load for providing a first voltage signal representing a voltage across said load;

a timer circuit coupled to said capacitor divider for providing a time-out sequence of a predetermined duration when said first voltage signal exceeds a predetermined threshold;

a protection circuit coupled to said timer circuit and said plurality of switches for shutting down said plurality of switches when said first voltage signal exceeds predetermined threshold for said predetermined duration; and a feedback control loop circuit coupled to said plurality of switches for receiving a feedback signal indicative of power being supplied to said load from a component receiving current from a secondary side of said transformer and for controlling a conduction state of at least one of said switches, said feedback control loop circuit comprises an operation state in which said switches deliver an amount of power to said load determined by said feedback signal; and an ignition state in which said switches deliver power to said load not exceeding a predetermined amount during a predetermined start time duration.

5. A liquid crystal display as claimed in claim 4 wherein said load comprises a cold cathode fluorescent lamp.

6. A liquid crystal display as claimed in claim 5 wherein said predetermined duration is sufficient for ignition of said cold cathode fluorescent lamp when properly operating.

7. A liquid crystal display as claimed in claim 5 wherein said predetermined start time duration is sufficient for ignition of said cold cathode fluorescent lamp when properly operating.

8. A liquid crystal display as claimed in claim 5 wherein said predetermined threshold represents a value of said voltage across said load greater than a minimum striking voltage of said cold cathode fluorescent lamp and less than a rated voltage of said transformer.

9. A liquid crystal display as claimed in claim 5 wherein said transformer has a primary winding and a secondary winding.

10. A liquid crystal display as claimed in claim 9 wherein said predetermined duration is sufficient for ignition of said cold cathode fluorescent lamp when properly operating.

11. A liquid crystal display as claimed in claim 9 wherein said predetermined start time duration is sufficient for ignition of said cold cathode fluorescent lamp when properly operating.

12. A liquid crystal display as claimed in claim 9 wherein said predetermined threshold represents a value of said voltage across said load greater than a minimum striking voltage of said cold cathode fluorescent lamp and less than a rated voltage of said transformer.

13. A DC to AC inverter controller circuit as claimed in claim 3 wherein said load comprises a cold cathode fluorescent lamp.

14. A DC to AC inverter controller circuit as claimed in claim 13 wherein said predetermined duration is sufficient for ignition of said cold cathode fluorescent lamp when properly operating.

15. A DC to AC inverter controller circuit as claimed in claim 13 wherein said predetermined start time duration is sufficient for ignition of said cold cathode fluorescent lamp when properly operating.

16. A DC to AC inverter controller circuit as claimed in claim 13 wherein said predetermined threshold represents a value of said voltage across said load greater than a minimum striking voltage of said cold cathode fluorescent lamp and less than a rated voltage of said transformer.

17. A DC to AC inverter controller circuit as claimed in claim 13 wherein said transformer has a primary winding and a secondary winding.

18. A DC to AC inverter controller circuit as claimed in claim 17 wherein said predetermined duration is sufficient for ignition of said cold cathode fluorescent lamp when properly operating.

19. A DC to AC inverter controller circuit as claimed in claim 17 wherein said predetermined start time duration is sufficient for ignition of said cold cathode fluorescent lamp when properly operating.

20. A DC to AC inverter controller circuit as claimed in claim 17 wherein said predetermined threshold represents a value of said voltage across said load greater than a minimum striking voltage of said cold fluorescent lamp and less than a rated voltage of said transformer.

\* \* \* \* \*